(12) United States Patent
Mae

(10) Patent No.: US 7,509,191 B2
(45) Date of Patent: Mar. 24, 2009

(54) FRAME DEFORMATION CONTROL APPARATUS

(75) Inventor: Hiroyuki Mae, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 915 days.

(21) Appl. No.: 10/938,481

(22) Filed: Sep. 10, 2004

(65) Prior Publication Data

US 2005/0065665 A1 Mar. 24, 2005

(51) Int. Cl.
*G05D 1/00* (2006.01)
*G05D 3/00* (2006.01)
*G06F 7/00* (2006.01)
*G06F 17/00* (2006.01)

(52) U.S. Cl. .................. 701/1; 701/29; 701/46; 296/187.03; 296/184.1; 296/187.11; 296/187.12; 296/193.07; 296/187.08; 296/203.01; 296/204; 340/436; 340/665; 340/438; 340/661; 280/734; 280/735; 293/137; 293/134; 293/133; 293/132; 293/136; 188/371; 188/377

(58) Field of Classification Search .................. 701/1, 701/29, 46; 296/187.03, 184.1, 187.11, 187.12, 296/193.07, 187.08, 203.01, 204; 340/436, 340/665, 438, 661; 280/734, 735; 293/137, 293/134, 133, 132, 136; 188/371, 377
See application file for complete search history.

(56) References Cited

U.S. PATENT DOCUMENTS

| 5,431,445 | A | * | 7/1995 | Wheatley .................. 280/784 |
| 5,460,421 | A | * | 10/1995 | Culbertson .................. 293/133 |
| 5,984,403 | A | * | 11/1999 | Kuroda .................. 296/187.03 |
| 6,019,419 | A | * | 2/2000 | Browne et al. .......... 296/187.1 |
| 6,193,303 | B1 | * | 2/2001 | Urushiyama et al. ... 296/187.03 |
| 6,296,299 | B1 | * | 10/2001 | Hanakawa et al. ..... 296/187.03 |
| 6,679,523 | B2 | * | 1/2004 | Yamamoto et al. .......... 280/785 |
| 2002/0033594 | A1 | * | 3/2002 | Yamamoto et al. .......... 280/781 |
| 2005/0067860 | A1 | * | 3/2005 | Makita et al. .......... 296/203.02 |

FOREIGN PATENT DOCUMENTS

| JP | 10-129521 | 5/1998 |
| JP | 2000-168624 | 6/2000 |

* cited by examiner

*Primary Examiner*—Khoi Tran
*Assistant Examiner*—Jorge O Peche
(74) *Attorney, Agent, or Firm*—Hamre, Schumann, Mueller & Larson, P.C.

(57) ABSTRACT

A frame deformation control apparatus to be used for a frame being constructed of a plurality of sub-frames, the frame deformation control apparatus has a joint unit connecting adjoining sub-frames, the joint unit allows the adjoining sub-frames to turn around the joint unit, a detector measuring a bending moment to be added to the joint unit, and a brake unit restricting the turn around the joint unit of the adjoining sub-frames.

2 Claims, 19 Drawing Sheets

ONLY FORE-SIDE FRAME CAUSES AN AXIAL DEFORMATION

ONLY REAR-SIDE FRAME CAUSES AN AXIAL DEFORMATION

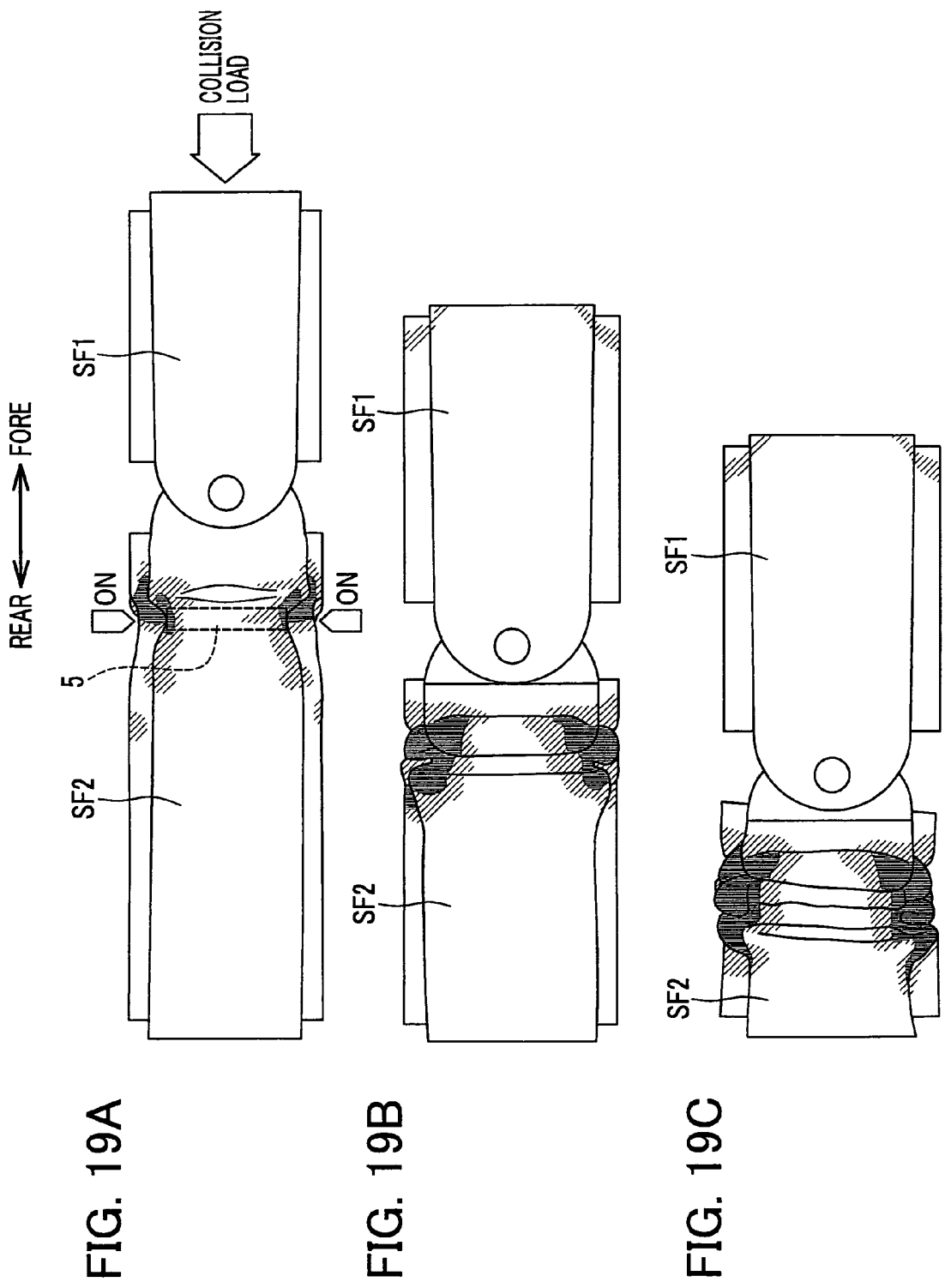

FRAME DEFORMATION CONTROL APPARATUS

BACKGROUND OF THE INVENTION

1. Field of the Invention

The present invention relates to a frame deformation control apparatus. More specifically, the present invention relates to an apparatus which can surely cause an axial deformation on a frame by controlling an active deformation of the frame.

2. Description of Relevant Art

Conventionally, to deform a frame of vehicle (vehicle frame) in a longitudinal direction thereof while restricting a bending deformation on middle of the frame has been required, in order to absorb a collision energy caused by a collision. Here, a longitudinal direction's deformation without bending deformation of the frame is called as "axial deformation".

As an example of these kinds of technique, the technique disclosed in Japanese unexamined patent publication No. 2000-168624 has been discovered. In this patent publication, a special bracket, which connects a power unit, such as a transfer or an engine disposed in the middle of a vehicle body, with side-frames, which hold the power unit from both sides thereof, is disclosed. By using this special bracket, a bending moment to be added to the side-frame can be cancelled.

As the other example, the technique disclosed in Japanese unexamined patent publication No. H10-129521 has been discovered. In this patent publication, a side-frame, onto which a pair of non-parallel slots is formed, is disclosed. In this side frame, if a collision had occurred, since a bending moment is intentionally induced at the region in the vicinity of the non-parallel slots, the bending moment caused by the collision is cancelled by the bending moment to be caused by slots.

In these conventional techniques, however, the bending moment to be caused on the region near the bracket or slots is cancelled with a reverse moment, which acts in a reverse direction with respect to the direction of the bending moment and which is caused as a result of the occurrence of the bending moment caused by the collision.

That is, in these conventional techniques, since the bending moment due to the collision is cancelled with the passively-caused reverse moment, the reverse moment does not necessarily correspond to the bending moment.

In case of the frame adopting a conventional technique, therefore, it is difficult to cause an axial deformation (crush) prior to the bending deformation of the frame, and thus the bending deformation of the frame may be caused prior to the axial deformation.

In case of the frame adopting a conventional technique, in which the bending moment is cancelled with the passively-caused reverse moment, the stiffness of the frame can not be changed in compliance with parameters, such as a collision rate and the position of an occupant.

In case of the frame adopting a conventional technique, furthermore, as the length of the frame becomes longer, it is difficult to cause only the axial deformation (crush) of the frame without causing the bending deformation.

This is because of the following reason. In case of the conventional technique, the position where the bracket or the slot is provided is determined in anticipation of the region where the bending moment to be caused by a collision is concentrated. Thus, as the frame becomes long, since the bending moment tends to be applied locally to another region where the bracket or the slot is not provided, the frame may cause the bending deformation on this region.

If the bending deformation arises on the frame, the efficiency of energy absorption of the collision energy as a whole becomes worse.

Therefore, a frame deformation control apparatus, which can surely cause an axial deformation on the frame prior to the bending deformation even if the length of the frame becomes longer, and can control the stiffness of the frame in compliance with parameters, such as a collision speed (rate) and the position of an occupant, has been required.

SUMMARY OF THE INVENTION

The present invention relates to a frame deformation control apparatus to be used for a frame composed of a plurality of sub-frames.

This frame deformation control apparatus includes a joint unit connecting adjoining sub-frames, the joint unit allowing the adjoining sub-frames to turn around the joint unit, a detector measuring a bending moment to be added to the joint unit, and a brake unit restricting the turn around the joint unit of the adjoining sub-frames.

The frame deformation control apparatus may further includes a moment canceller and/or a brake release unit. Here, the moment canceller causes a reverse moment, which acts in an opposite direction with respect to the bending moment measured by the detector, when the bending moment measured by the detector exceeds a predetermined value. The brake release unit removes the restriction of the turn around the joint unit of the adjoining sub-frames, when the bending moment measured by the detector exceeds a predetermined value.

According to the frame deformation control apparatus, the reverse moment, which acts in an opposite direction with respect to the bending moment, is caused by the moment canceller, when the bending moment to be added to the frame exceeds a predetermined value. Then, the reverse moment is applied to the frame.

That is, if the control unit of the frame deformation control apparatus judges the bending moment being applied to the joint unit (frame) exceeds a predetermined value, based on a signal entered from the detector, the control unit actuates the bending moment canceller and causes the reverse moment.

Therefore, if the bending moment exceeding the predetermined value (threshold value) is applied to the joint unit connecting adjoining sub-frames, since the reverse moment which cancels the bending moment is caused, an axial deformation of the frame can be caused prior to the bending deformation.

Additionally, since the amount of the reverse moment can be controlled in compliance with parameters, such as a collision rate or the position of an occupant, the stiffness of the frame can be controlled in compliance with these parameters.

In the present invention, it is preferable that the brake release unit removes the restriction of the turn around the joint unit of the adjoining sub-frames, when the bending moment exceeding the threshold value is applied to the frame (joint unit connecting adjoining sub-frames).

In this case, since the restriction of the turn around the joint unit of the adjoining sub-frames is removed even if the bending moment is locally applied on any region of the frame, the frame deformation control apparatus can surely cause an axial deformation of the frame prior to the bending deformation even if the length of the frame is long.

In the present invention, it is still more preferable that the axial deformation accelerator, which applies a side-force in order to induce the axial deformation on the sub-frame, is provided.

Here, the term "side-force" means that the force which is applied to an almost orthogonal direction with respect to a longitudinal direction of the frame. That is, if it is assumed that the frame is a frame of a vehicle body, the side-force is the force applied in a width direction, which is an almost orthogonal direction with respect to a fore-and-rear direction of the vehicle.

To be exact, the side-force can be the force directed to all the directions except for a longitudinal direction of the frame. It is preferable that the side-force is the force directed to the orthogonal direction with respect to the longitudinal direction of the frame, in order to promote surely the axial deformation of the frame.

Therefore, if the side-force is applied to the frame by the axial deformation accelerator when the collision load is added to the frame along a longitudinal direction thereof, the axial deformation can be caused from the region, to which the side-force is applied. Thus, the axial deformation of the side-frame can be caused on a desired position.

BRIEF DESCRIPTION OF THE DRAWINGS

FIG. 19A is an explanatory view showing the beginning of the axial deformation of the rear-side frame, wherein the buckling device is disposed in a fore-side of the rear-side frame.

FIG. 19B is an explanatory view showing the state where the axial deformation of the rear-side frame is in progress, wherein the buckling device is disposed in a fore-side of the rear-side frame.

FIG. 19C is an explanatory view showing the state where the axial deformation of the rear-side frame has been terminated, wherein the buckling device is disposed in a fore-side of the rear-side frame.

DETAILED DESCRIPTION OF THE PREFERRED EMBODIMENT

The preferred embodiment of the present invention will be described with reference to the accompanying drawings.

First Embodiment

Firstly, as one embodiment of the frame deformation control apparatus, an active deformation control unit 1 applied to the frame disposed in a fore-side of a vehicle will be explained.

Figure 1:
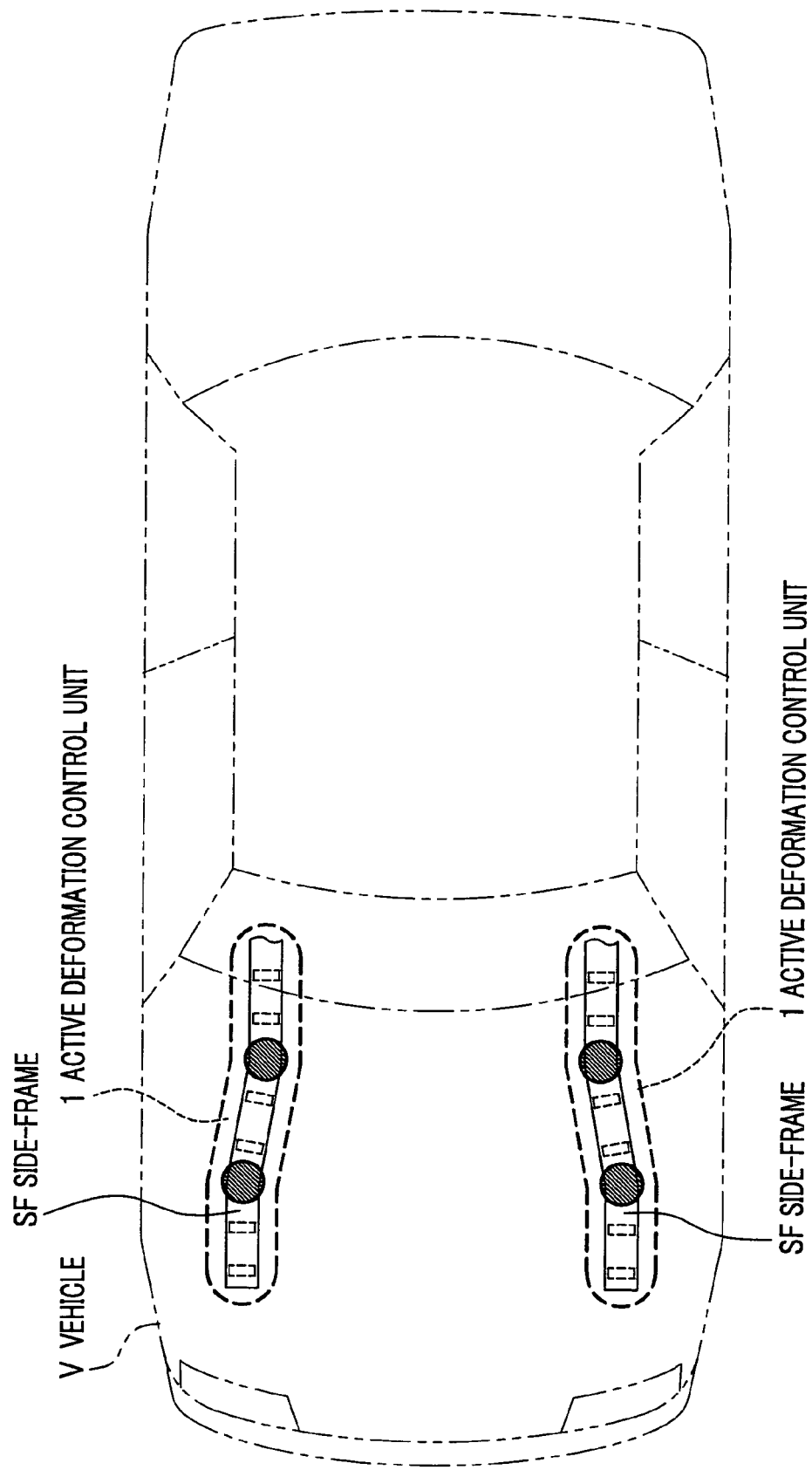
FIG. 1 is a plane view showing the side-frame, to which the frame deformation control apparatus is provided.

As shown in FIG. 1, a side-frame SF arranged along a fore-and-rear direction of a vehicle V is disposed at both sides in a fore-side of the vehicle V. Each side-frame SF is divided into a plurality of sub-frames at predetermined positions thereof, and is provided with an active deformation control unit 1.

Figure 2:
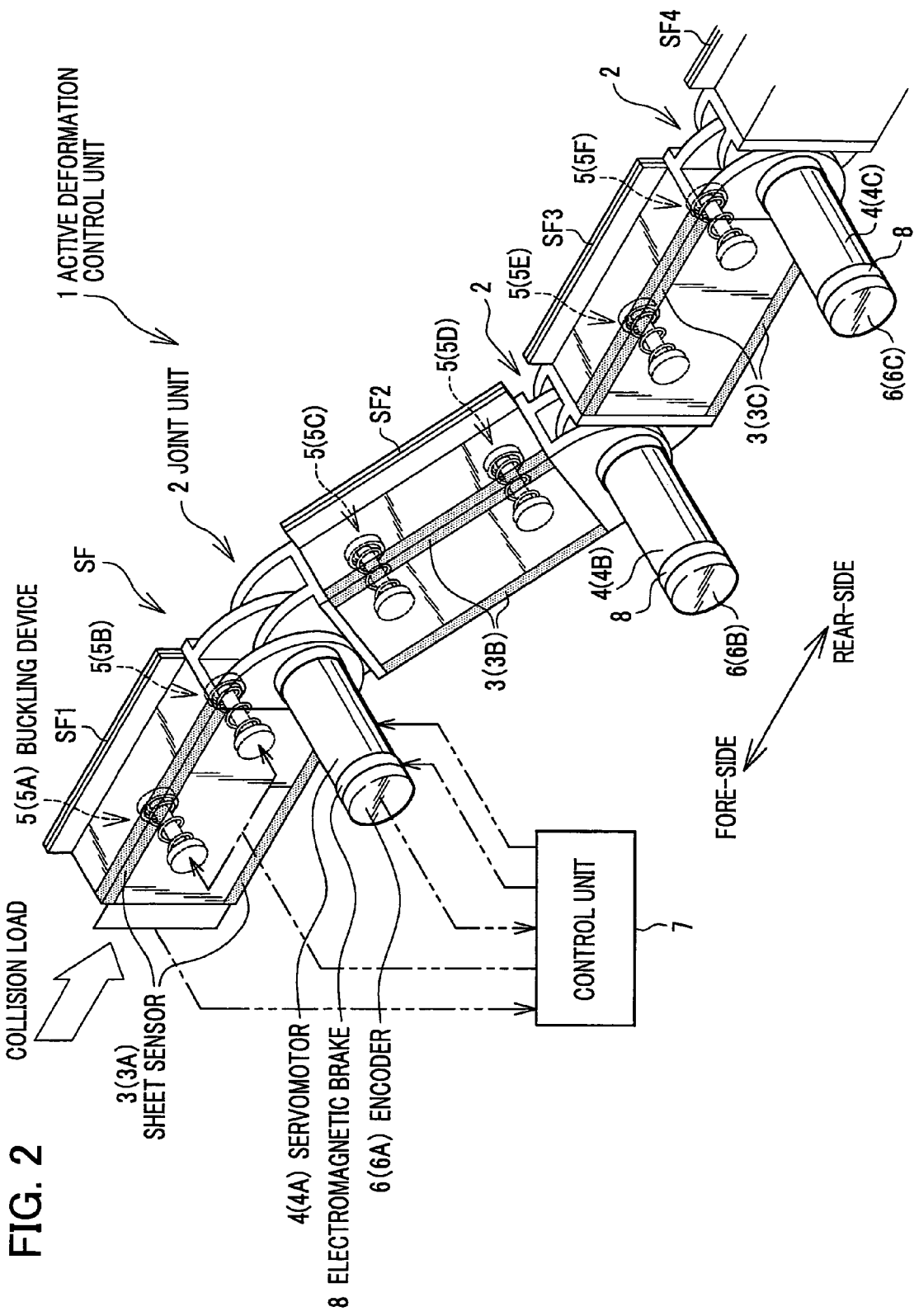
FIG. 2 is a partially enlarged view of FIG. 1.

As shown in FIG. 2, the active deformation control unit 1 includes a joint unit 2, a sheet sensor 3, and a servomotor 4.

The joint unit 2 joins adjoining sub-frames while allowing the mutual turn around the joint unit 2 of adjoining sub-frames. Here, the side-frame SF is composed of a plurality of sub-frames. The sheet sensor 3, which is a sheet-like shaped sensor, senses a collision load etc., added to the side-frame SF. The servomotor 4, which supplies rotative force to the joint unit 2, serves as moment canceller.

The active deformation control unit 1 further includes a buckling device 5, an encoder 6, a control unit 7, and an electromagnetic brake 8.

The buckling device 5 promotes an axial deformation of the side-frame SF by adding a side-force to the side-frame SF. The encoder 6 is coaxially provided with the servomotor 4 and measures a moment force (bending moment). The control unit 7 controls the motion of the servomotor 4 and the buckling device 5 based on signal entered from the encoder 6 and the sheet sensor 3. The electromagnetic brake 8 restricts the mutual turn around the joint unit 2 of sub-frames.

In FIG. 2, only the signals being exchanged with the control unit 7 is indicated by arrow. The exchange of signal is performed similarly in other portions of the active deformation control unit 1.

In the present embodiment, the side-frame SF is divided into four parts (sub-frames). That is, the side-frame SF composed of four sub-frames is adopted. Therefore, in order to distinguish each sub-frame, respective sub-frames are indicated, from fore-side of the vehicle V, as a first frame SF1, a second frame SF2, a third frame SF3, and a fourth frame SF4.

Figure 3:
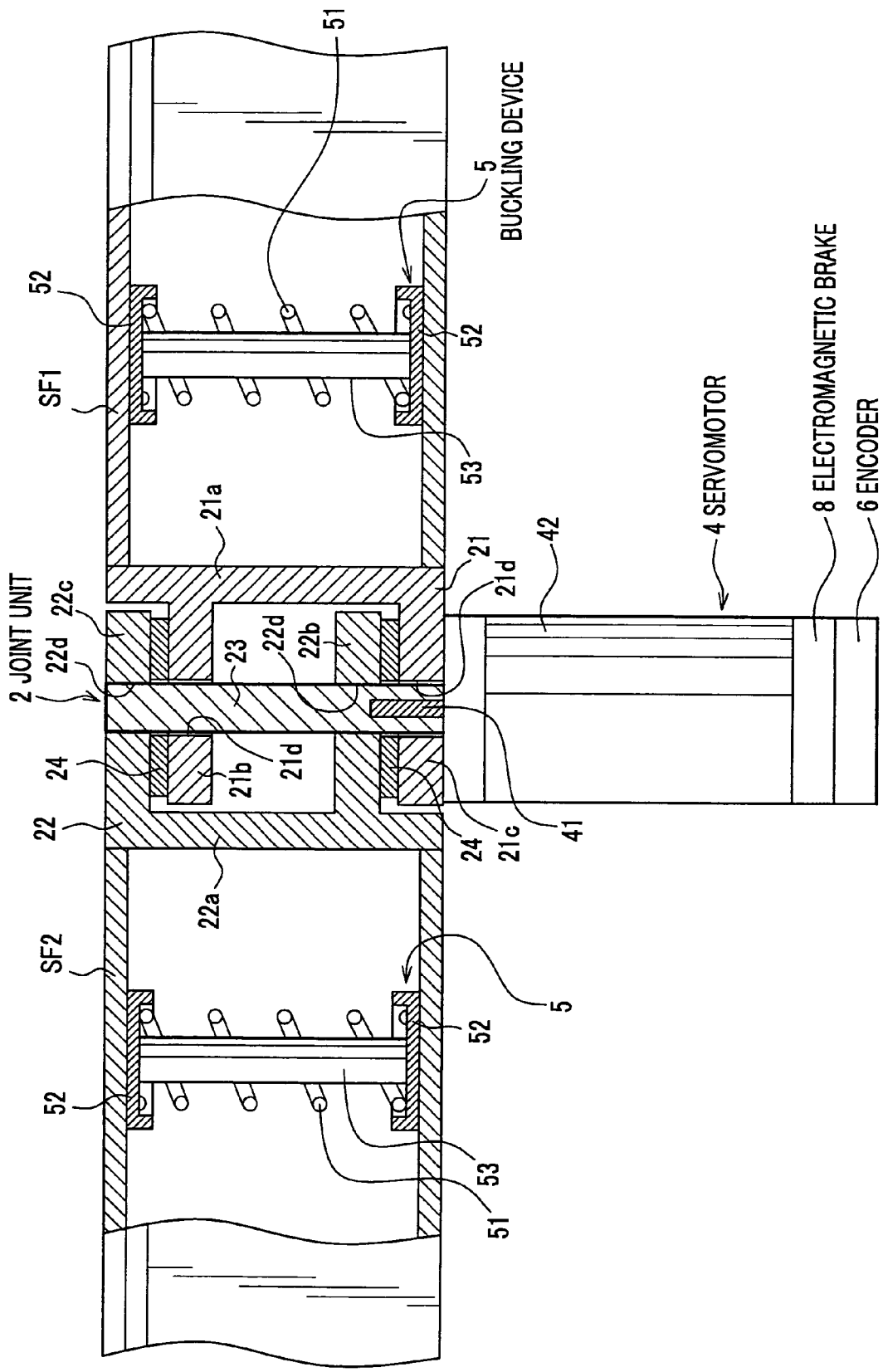
FIG. 3 is a sectional view showing the joint unit of FIG. 2.

The joint unit 2, as shown in FIG. 3, includes a first hinge 21, a second hinge 22, a connection shaft 23, and a spacer 24.

The first hinge 21 is composed of a connection plate 21a and junction parts 21b and 21c. The connection plate 21a is being fixed to the first frame SF1, and respective junction parts 21b and 21c are prolonged from the connection plate 21a in a direction opposite to the first frame SF1. As can be seen from FIG. 3, the first hinge 21 has a shape of an alphabet "F" in sectional viewing.

A hole 21d, into which the connection shaft 23 is inserted, is formed on respective junction parts 21b and 21c. Here, the connection shaft 23 is being rotatable with respect to the first hinge 21.

The second hinge 22, similar to the first hinge 21, is composed of a connection plate 22a, which is fixed to the second frame SF2, and junction parts 22b and 22c. As can be seen from FIG. 3, the second hinge 22 has a shape of an alphabet "F" in sectional viewing. A hole 22d, into which the connection shaft 23 is inserted, is formed on respective junction parts 22b and 22c.

Here, the connection shaft 23 is fixed, by providing a key groove etc., on the hole 22d, with respective junction parts 22b and 22c. Thereby, the connection shaft 23 is being un-rotatable with respect to the second hinge 22.

As shown in FIG. 3, the first hinge 21 is coupled with the second hinge 22 in the condition that the first hinge 21 and the second binge 22 are upside down with each other. A ring-shaped spacer 24 is provided between the junction parts 22b and 21c and between the junction parts 22c and 21b, respectively.

In this FIG. 3, the construction of the joint unit 2 positioned between the first frame SF1 and the second frame SF2 is indicated. In the present embodiment, the construction of this joint unit 2 is the same as the construction of the joint unit 2 between the second frame SF2 and the third frame SF3 and the construction of the joint unit 2 between the third frame SF3 and the fourth frame SF4.

As shown in FIG. 2, the sheet sensor 3 is a long sheet to be bonded along the corner of respective sub-frames, that is, the first frame SF1, the second frame SF2, and the third frame SF3, and includes an optic fiber (not shown), a strain gauge (not shown), and a piezoelectric element (not shown) therein.

The sheet sensor 3 detects the deformation and deformation acceleration of side-frame SF by the optic fiber, measures a sign of the change from elastic region to plastic region by the strain gauze, and detects a collision load by the piezoelectric element.

In the following explanation, in order to distinguish each sheet sensor 3, respective sheet sensors 3 are indicated, from fore side of the vehicle V, as a first sheet 3A, a second sheet 3B, and a third sheet 3C.

The servomotor 4, as shown in FIG. 3, is fixed to the junction parts 21c of the first hinge 21. A rotation shaft 41 of this servomotor 4 is located coaxially with respect to the connection shaft 23, and is joined with the connection shaft 23 in the condition that the relative rotation between the rotation shaft 41 and the connection shaft 23 is inhibited. Thereby, the connection shaft 23 is rotated in compliance with the rotation of the rotation shaft 41 of the servomotor 4.

The servomotor 4, in usual state, forbids the relative rotation between a body 42 and the connection shaft 23 based on a control signal entered from the control unit 7 (see FIG. 2), and adds a moment toward the direction opposite to the direction of the bending moment applied to the side-frame SF, to the connection shaft 23 when a collision occurred.

In the present embodiment, the servomotor 4 is used as a means for canceling a moment. But, a stepping motor etc., can be adoptable instead of the servomotor 4.

The buckling device 5 includes a spring member 51, mounting brackets 52 and 52, an electric heater 53, and a power source (not shown). The spring member is a coil-like shaped spring made of a shape-memory alloy. The mounting bracket 52 is provided on both ends of the spring member 51. The electric heater 53 heats the spring member 51 in compliance with a power supplied from the power source.

Referring to FIG. 2, respective sub-frames of the side-frames SF, that is, the first frame SF1, the second frame SF2, and the third frame SF3, are provided with two buckling devices 5. One of buckling devices 5 is positioned in a fore-side of the sub-frame and the other of buckling devices 5 is positioned in a rear-side of the sub-frame.

Here, since a hollow frame is adopted as sub-frame (side-frame SF), the buckling device 5 is installed within the sub-frame. To be more precise, in case of FIG. 3, the buckling device 5 is sandwiched between opposing walls of the first frame SF1 (the second frame SF2).

According to this buckling device 5, a force (side-force) directed to the outward direction is applied to the side-frame SF, when the power source is turned on and the electric heater 53 is actuated. This is because the spring member 51 is extended in a longitudinal direction due to a thermal expansion. Therefore, in case of FIG. 3, since the spring member 51 is extended in a ups-and-downs direction in FIG. 3, a force (side-force) pushing the opposing walls of the side-frame SF to the outward direction is applied to the side-frame SF from the inside thereof.

As shown in FIG. 2, in the following explanation, in order to distinguish each buckling device 5, respective buckling devices 5 are also indicated, from fore side of the vehicle, as a first device 5A, a second device 5B, a third device 5C, a fourth device 5D, a fifth device 5E, and a sixth device 5F.

In the present embodiment, the expansion of the spring member 51 is caused by adding a heat to the spring member 51 using the electric heater 53. But, the expansion of the spring member 51 may be caused by applying a direct current to the spring member 51.

In the present embodiment, additionally, coil-like shaped spring is adopted as the spring member 51. But, the shape of the spring member 51 is not limited to this, and various kinds of springs, for example, a non-liner plate spring etc., may be adoptable as this spring member 51.

The encoder 6 is a sensor measuring a moment to be applied to the connection shaft 23. The encoder 6, more specifically, is a sensor for obtaining parameter data, such as a turning angle and a torque, that is required for computing a moment.

In the following explanation, in order to distinguish each encoder 6, respective encoders 6 are also indicated, from fore side of the vehicle, as a first encoder 6A, a second encoder 6B, and a third encoder 6C. Also, in order to distinguish each servomotor 4, respective servomotors 4 are also indicated, from fore side of the vehicle, as a first motor 4A, a second motor 4B, and a third motor 4C.

The electromagnetic brake 8, in usual state, prohibits a rotation of the connection shaft 23 by continuously applying a braking force to the connection shaft 23. On the contrary, the electromagnetic brake 8 releases (disengage) the braking force when the side-frame SF receives a predetermined moment.

Figure 4:
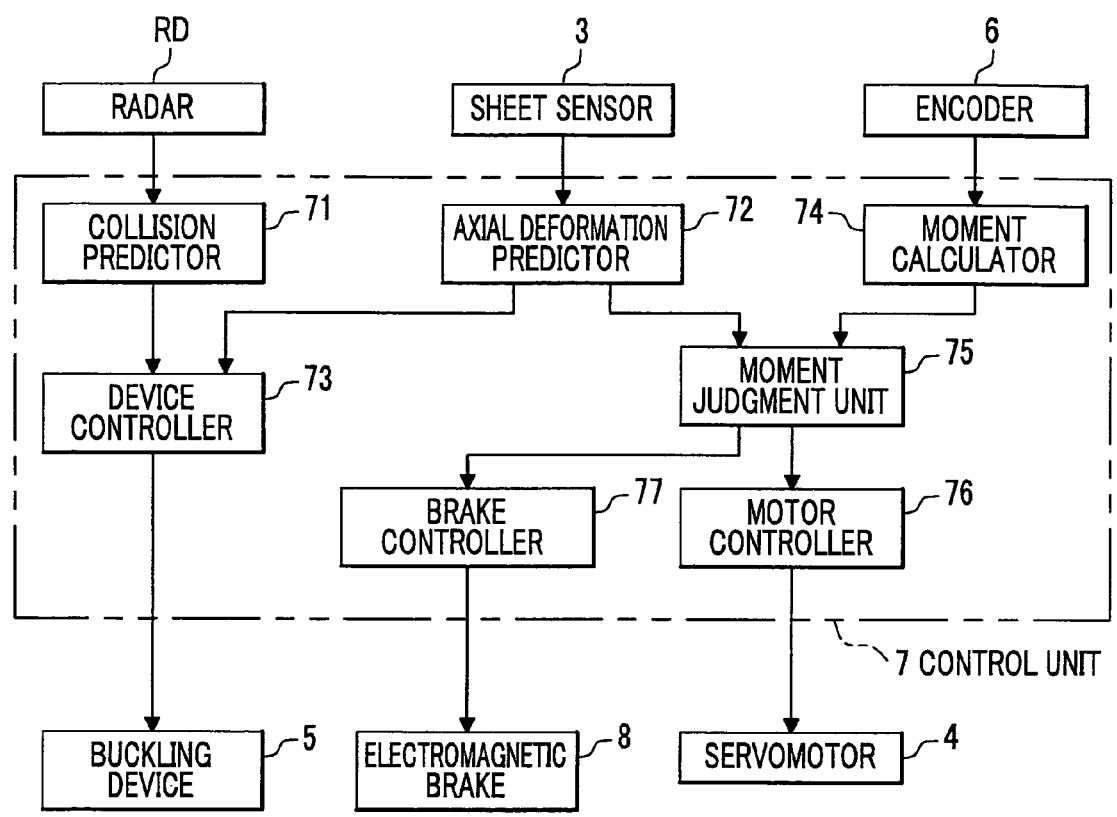
FIG. 4 is a block diagram showing the control unit of FIG. 2.

As shown in FIG. 4, the control unit 7 includes a collision predictor 71, an axial deformation predictor 72, a device controller 73, a moment calculator 74, a moment judgment unit 75, a motor controller 76, and a brake controller 77.

The collision predictor 71 judges whether or not a collision occurs based on the signal entered from a radar RD. Here, the radar RD is disposed at front side of the vehicle V and is used for detecting the occurrence of front-side collision of the vehicle V. The collision predictor 71, if it is judged that the collision will occur, outputs a signal notifying the occurrence of the collision to the device controller 73.

The axial deformation predictor 72 checks the progress of the axial deformation about respective sub-frames, that is, the first frame SF1, the second frame SF2, and the third frame SF3, based on a signal entered from the sheet sensor 3. To be more specific, the axial deformation predictor 72 measures the progress of the axial deformation of respective frames in order of the first frame SF1, the second frame SF2, and the third frame SF3.

The axial deformation predictor 72 outputs a signal, which indicates the deformation is in progress, to the moment judgment unit 75, if it is judged that the axial deformation is in progress on a predetermined region (for example, fore-side region of the first frame SF1) of the frame. On the contrary, the axial deformation predictor 72 outputs a signal, which indicates the deformation has been terminated, to the device controller 73, if it is judged that the axial deformation have been terminated on a predetermined region (for example, fore-side region of the first frame SF1).

The device controller 73 outputs a signal, which commands the activation of the power source, to the first device 5A (see FIG. 2) disposed in a fore-side of the first frame SF1, when a signal is entered from the collision predictor 71.

Additionally, the device controller 73 outputs a signal, which commands the activation of the power source, to the second device 5B, when a signal is entered from the axial deformation predictor 72. Here, the signal entered from the axial deformation predictor 72 is for example the signal indicating that the axial deformation has been terminated in a fore-side of the first frame SF1.

The moment calculator 74 computes the bending moment being added to the connection shaft 23 based on the signal entered from the encoder 6, and the moment calculator 74 outputs a signal, which indicates a computed result, to the moment judgment unit 75. Here, in case of FIG. 2, a total of three encoders (the first encoder 6A, the second encoder 6B, and the third encoder 6C) are provided. Thus, the moment calculator 74 computes the bending moment about respective encoders.

The moment judgment unit 75, when a signal is entered from the axial deformation predictor 72, obtains the bending moment from the signal entered from the moment calculator 74, and compares the bending moment with a collapse moment. Here, the collapse moment is an intensity of a moment that causes a bending deformation of the side-frame SF, and data of the collapse moment is stored beforehand in a recording unit (not shown).

In the present embodiment, the moment calculator 74 computes a bending moment based on the signal entered from the encoder 6. But, the bending moment may be computed using another signal. For example, the moment calculator 74 may compute the bending moment based on the signal entered from the sheet sensor 3.

The moment judgment unit 75 outputs a signal, which forbids an actuation of the servomotor 4, to the motor controller 76, when the bending moment is smaller than the collapse moment. On the other hand, the moment judgment unit 75 outputs a signal, which commands the servomotor 4 to rotate with a predetermined torque, to the motor controller 76, when the bending moment exceeds the collapse moment.

The motor controller 76 controls the actuation and stop of the servomotor 4 based on the signal entered from the moment judgment unit 75.

The moment judgment unit 75, furthermore, outputs a signal, which actuates the electromagnetic brake 8 in order to inhibit the rotation of the connection shaft 23, to the brake controller 77, when the bending moment is smaller than the collapse moment. On the other hand, the moment judgment unit 75 outputs a signal, which commands to release the electromagnetic brake 8 from the actuation condition in order to allow the rotation of the connection shaft 23, to the brake controller 77, when the bending moment exceeds the collapse moment.

The brake controller 77 controls the actuation and stop of the electromagnetic brake 8 based on the signal entered from the moment judgment unit 75.

Signal Processing in the Control Unit 7

Next, the signal processing in the control unit 7 will be explained mainly with reference to FIG. 4 and FIG. 5, and appropriately with reference to FIG. 2 and FIG. 3.

Figure 5:
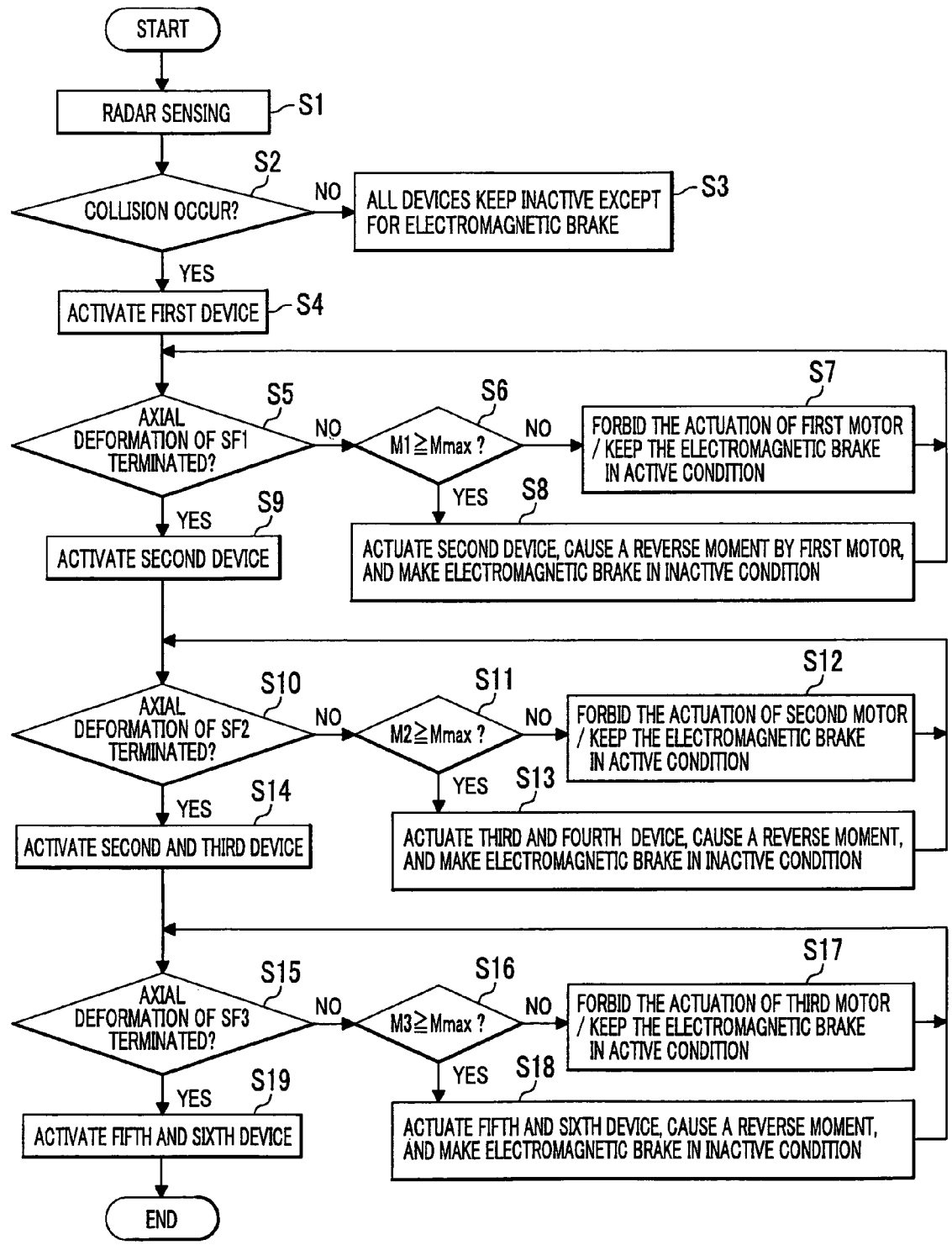
FIG. 5 is a flow chart showing the signal processing performed in the control unit.

FIG. 5 is a flow chart showing the signal processing performed in the control unit 7.

Referring to FIG. 5, when a signal is entered from the radar RD, which is used for checking the occurrence of the collision of the vehicle V (step S1), the collision predictor 71 judges whether or not the collision of the vehicle V will occur based on the signal entered from the radar RD (step S2).

If the collision predictor 71 judges that the collision of the vehicle V does not occur (step S2, NO), the buckling device 5 and the servomotor 4 are kept in an inactive condition (step S3). That is, all devices to be used for controlling the deformation of the frame are kept in an inactive condition except for the electromagnetic brake 8. In this occasion, the electromagnetic brake 8 are kept in an active condition so as to hold the connection part of frames in order to forbid the mutual turn around the connection shaft 23 of sub-frames.

If it is judged that the collision of the vehicle V will occur (step S2, YES), the first device 5A is activated by the device controller 73. Thereby, the side force caused by the spring member 51 of the first device 5A is added to the fore-side of the first frame SF1 (step S4).

Next, the axial deformation predictor 72 checks whether or not the axial deformation of the first frame SF1 has been terminated, based on information entered from the first sheet 3A (step S5).

If it is judged that the axial deformation has not been terminated, that is, the axial deformation is in progress (step S5, NO), the moment judgment unit 75 compares the bending moment M1, which was measured by the first encoder 6A, with the collapse moment Mmax (step S6).

If the bending moment M1 is smaller than the collapse moment Mmax (step S6, NO), the motor controller 76 inhibit the actuation of the first motor 4A (step S7) while keeping the electromagnetic brake 8 in an active condition. Then, the signal processing is returned to step S5.

If the bending moment M1 exceeds the collapse moment Mmax (step S6, YES), the second device 5B is turned on, the electromagnetic brake 8 is made into an inactive condition, and the first motor 4A is rotated (actuated)(step S8). Thereby, a reverse moment, which is a moment toward an opposite direction with respect to the direction of the bending moment M1, and which cancels the bending moment M1, is caused in compliance with the rotation around the connection shaft 23 of the sub-frames. Then, the signal processing is returned to step S5.

If it is judged that the axial deformation has been terminated (step S5, YES), the device controller 73 activates the second device 5B. Here, if the second device 5B has already been activated, the second device 5B is kept in an active condition. Thereby, the side-force caused by the spring member 51 is added to the rear-side of the first frame SF1 (step S9).

Next, the axial deformation predictor 72 checks whether or not the axial deformation of the second frame SF2 has been terminated, based on information entered from the second sheet 3B (step S10).

If it is judged that the axial deformation has not been terminated, that is, the axial deformation is in progress (step S10, NO), the moment judgment unit 75 compares the bending moment M2, which was measured by the second encoder 6B, with the collapse moment Mmax (step S11).

If the bending moment M2 is smaller than the collapse moment Mmax (step S11, NO), the motor controller 76 inhibit the actuation of the second motor 4B (step S12) while keeping the electromagnetic brake 8 in an active condition. Then, the signal processing is returned to step S10.

If the bending moment M2 exceeds the collapse moment Mmax (step S11, YES), the third device 5C and the fourth device 5D are turned on, the electromagnetic brake 8 is made into an inactive condition, and the second motor 4B is rotated (actuated). Thereby, the reverse moment, which is a moment toward an opposite direction with respect to the direction of the bending moment M2, and which cancels the bending moment M2, is caused in compliance with the rotation around the connection shaft 23 of the sub-frames. Then, the signal processing is returned to step S10.

If it is judged that the axial deformation has been terminated (step S10, YES), the device controller 73 activates the third device 5C and the fourth device 5D. Here, if the third device 5C and the fourth device 5D have already been activated, the third device 5C and the fourth device 5D are kept in an active condition. Thereby, the side-force caused by the spring member 51 is added to the corresponding region of the second frame SF2 (step S14).

Then, the signal processing like steps S10 through S14 is performed in the third frame SF3 (step S15-S19).

Here, step S15, step S16, step S17, step S18, and step 19 correspond to step S10, step S11, step S12, step S13, and step S14, respectively.

A symbol "M3" denotes a bending moment detected by the third encoder 6C. After step S19 is terminated, the signal processing is terminated.

In the above described embodiment, the signal processing, which is performed in case that collision load is added from the fore-side of the first frame SF1, has been explained.

If collision load is added from the rear-side of the fourth frame SF4, the axial deformation of the side-frame SF as a whole can be achieved by reversing the processing order of frames (the first frame SF1 through the third frame SF3).

Simulation of the Deformation of the Side-Frame SF

Next, a simulation result of an axial deformation of the side-frame SF under the control of the active deformation control unit 1 will be explained.

Figure 6A:
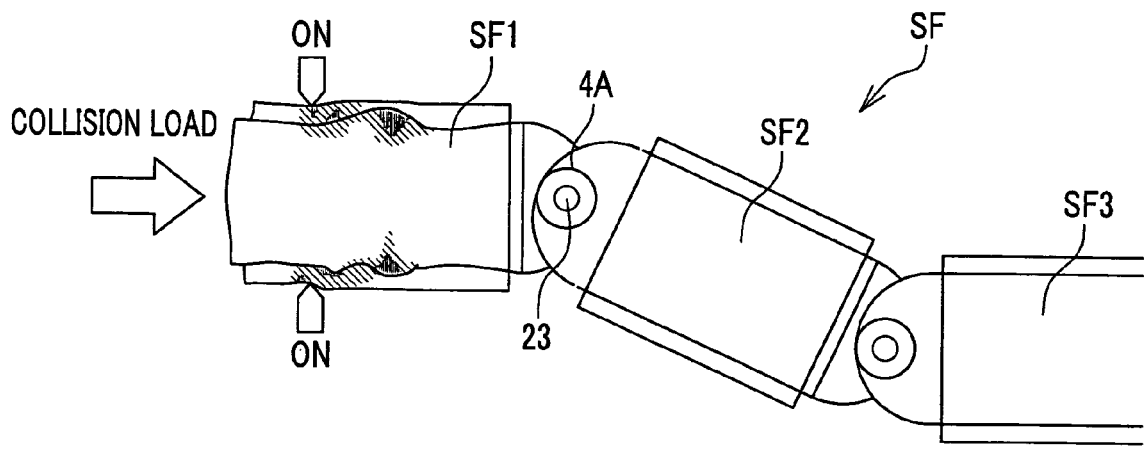
FIG. 6A is an explanatory view showing the beginning of the axial deformation of the side-frame.

As shown in FIG. 6A, if collision load is added to the fore-side of the first frame SF1, the side force is caused in the vicinity of the first device 5A by activating the first device 5A (see FIG. 2). Thereby, the axial deformation is caused on the region the side force is added to. Here, the region the side force is added to is shown by a symbol "ON".

In this occasion, if one of the first encoder 6A, the second encoder 6B, and the third encoder 6C detects the bending moment of more than the collapse moment, the motor corresponding to the encoder, which detected the bending moment of more than the collapse moment, is turned on. Thereby, the reverse moment caused by the motor cancels the bending moment.

Figure 6B:
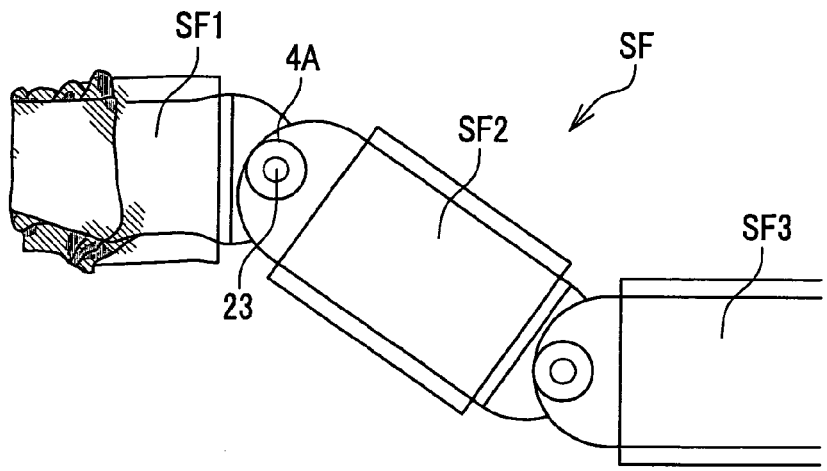
FIG. 6B is an explanatory view showing the state where the axial deformation of the side-frame is in progress.

Thus, while in the progress of the axial deformation, the condition of respective motors, that is, the first motor 4A, the second motor 4B, and the third motor 4C, is suitably switched between the rotation condition and the fixed condition. Thereby, as can be seen from FIGS. 6B and 6C, the axial deformation of the side-frame SF is achieved instead of the bending deformation of the side-frame SF (the first frame SF1, the second frame SF2, and the third frame SF3).

Figure 7A:
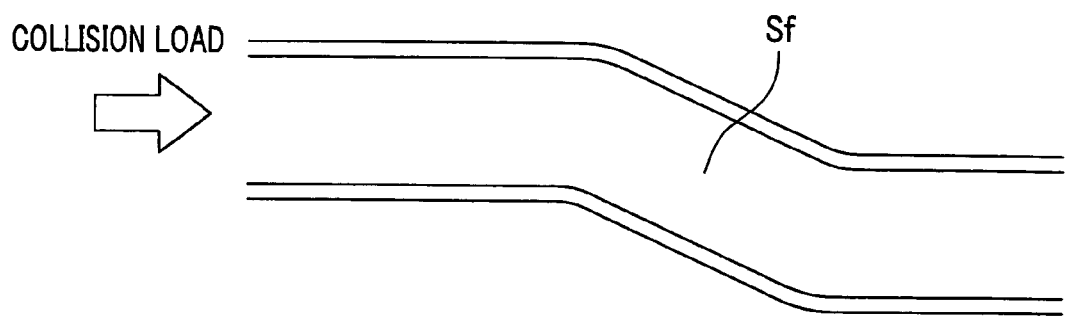
FIG. 7A is an explanatory view showing the conventional side-frame, to which the collision load is not yet applied.
Figure 7B:
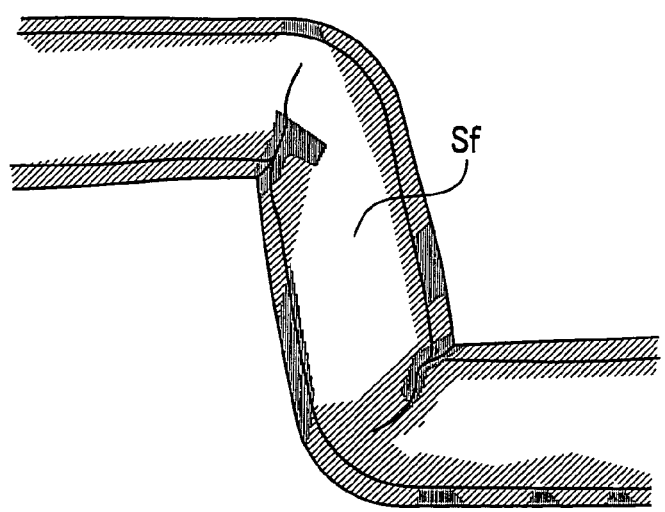
FIG. 7B is an explanatory view showing the conventional side-frame, to which the collision load has been applied.

In FIG. 7A, the conventional side-frame Sf is indicated as comparative example of the present embodiment. In this conventional side-frame Sf, if the bending moment of more than collapse moment is added to the curved region, the bending deformation of the side-frame Sf occurs (see FIG. 7B).

Figure 6C:
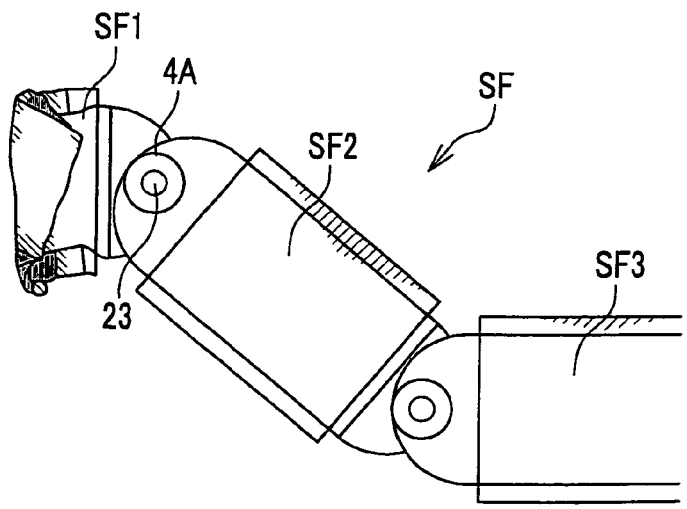
FIG. 6C is an explanatory view showing the state where the axial deformation of the side-frame has been terminated.

On the contrary, as shown in FIG. 6C, if the bending moment of more than the collapse moment is added, the side-frame SF of the present embodiment causes the axial deformation while keeping the profile of the side-frame SF.

Next, the comparison result between the conventional side-frame and the side-frame of the present embodiment will be explained.

Figure 8A:
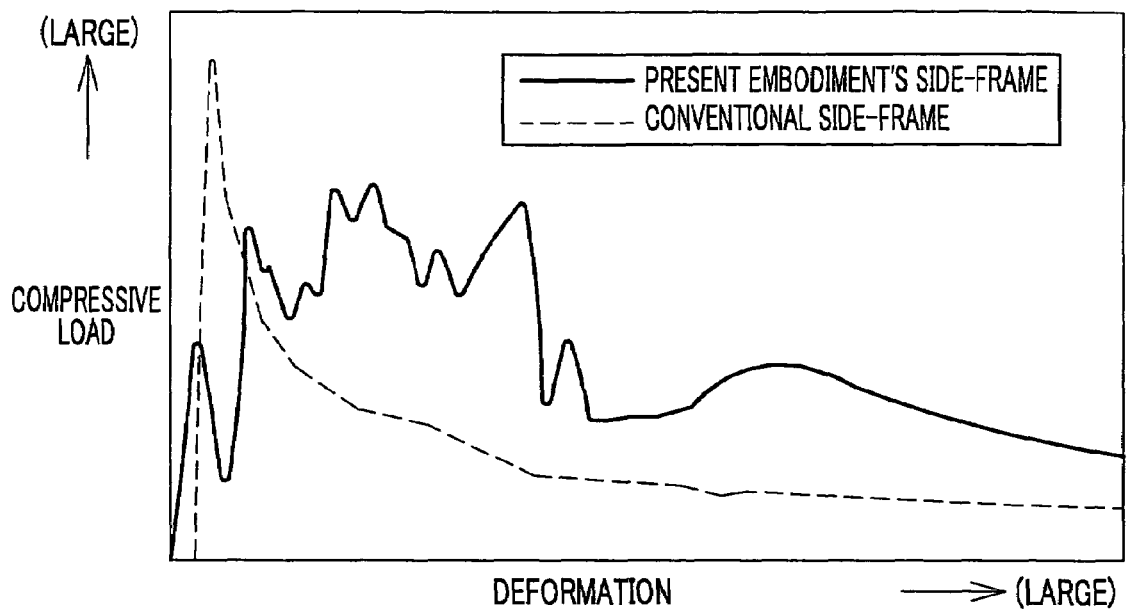
FIG. 8A is a graph showing the relation between a compressive load and a deformation of the frame.

As shown in FIG. 8A, in the conventional side-frame, a large compressive load is added to the side-frame during the early stage of the axial deformation of the side-frame. Then, the compressive load begins to decrease due to the bending deformation of the side-frame.

On the contrary, in the side-frame of the present embodiment, the large compressive load is constantly added to the side-frame SF, by preventing the occurrence of the bending deformation.

In other words, in the side-frame of the present embodiment, the compressive load, which is about twice as large as the average of the compressive load to be added to the conventional side-frame, can be added to the side-frame of the present embodiment.

Thereby, in the side-frame of the present embodiment, the axial deformation of the side-frame can be achieved easily than the conventional construction's side-frame. This is because comparatively high compressive load is added to the frame.

Figure 8B:
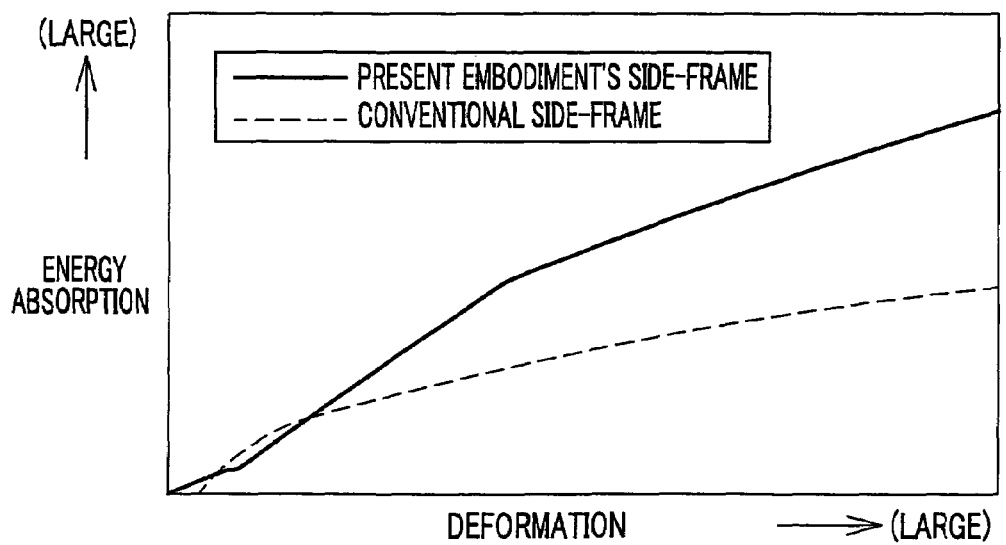
FIG. 8B is a graph showing the relation between energy absorption and a deformation of the frame.

As shown in FIG. 8B, the amount of energy absorption of the side-frame SF of the present embodiment is increased about 75% compared with the amount of energy absorption of the conventional side-frame.

Thereby, the side-frame SF of the present embodiment can absorb the collision load sufficiently than the conventional side-frame.

Here, if the side-frame SF of the present embodiment is actually applied to the actual vehicle frame, since the amount of the energy absorption according to the side-frame SF of the present embodiment is improved about 75% than the conventional side-frame, which absorbs about 30% of energy of all impact energies in a head-on collision, about 50% of energy is absorbable in the construction of the side-frame SF of the present embodiment.

Thereby, since a stroke, which is a length (space) to be required for the absorption of impact energy, can be minimized, the length of the side-frame in a fore-side of the vehicle can be shorter. This allows the capacity of a vehicle cabin space to be made wider.

According to the present embodiment, the benefits as follows can be obtained.

The bending moment caused by collision is canceled with the moment, which is caused by the control unit 7 and the servomotor 4. Thus, the axial deformation can be caused in preference to the bending deformation.

In the present embodiment, the axial deformation is caused from the region, to which the side force is applied using the buckling device 5. Thus, the axial deformation of the side-frame SF can be caused on a desired position.

Additionally, since the amount of the moment to be caused by the control unit 7 and the servomotor 4 can be controlled in compliance with parameters, such as a collision rate or the position of an occupant, the stiffness of the side-frame SF can be controlled in compliance with these parameters.

In this case, additionally, it is required to detect the collision rate using the radar RD or to detect a sitting position or a weight of an occupant using a seat weight sensor installed in a vehicle seat.

Figure 9:
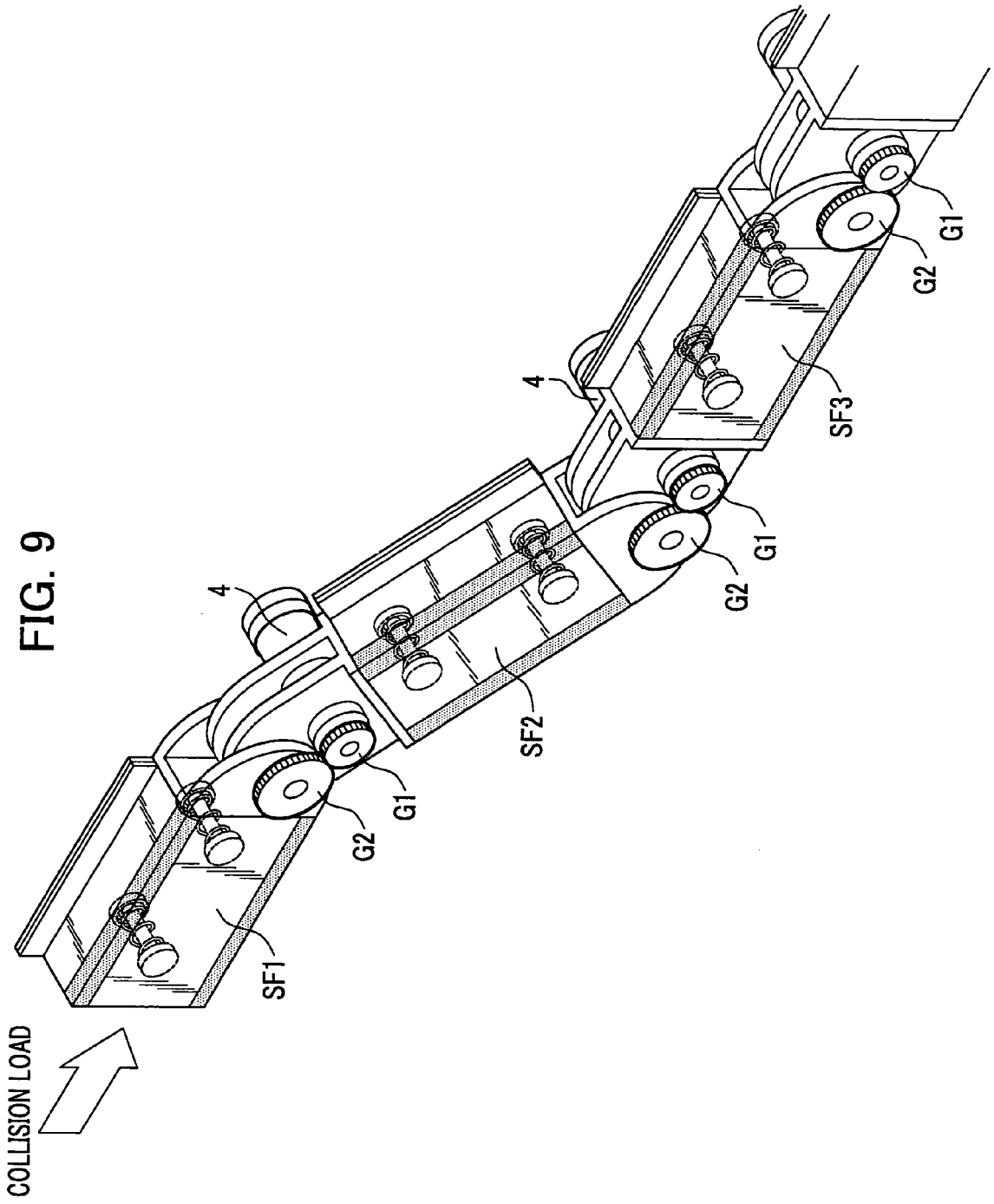
FIG. 9 is a perspective view showing the side-frame, to which the frame deformation control apparatus is provided, wherein the connection shaft and the servomotor are provided separately.
Figure 10:
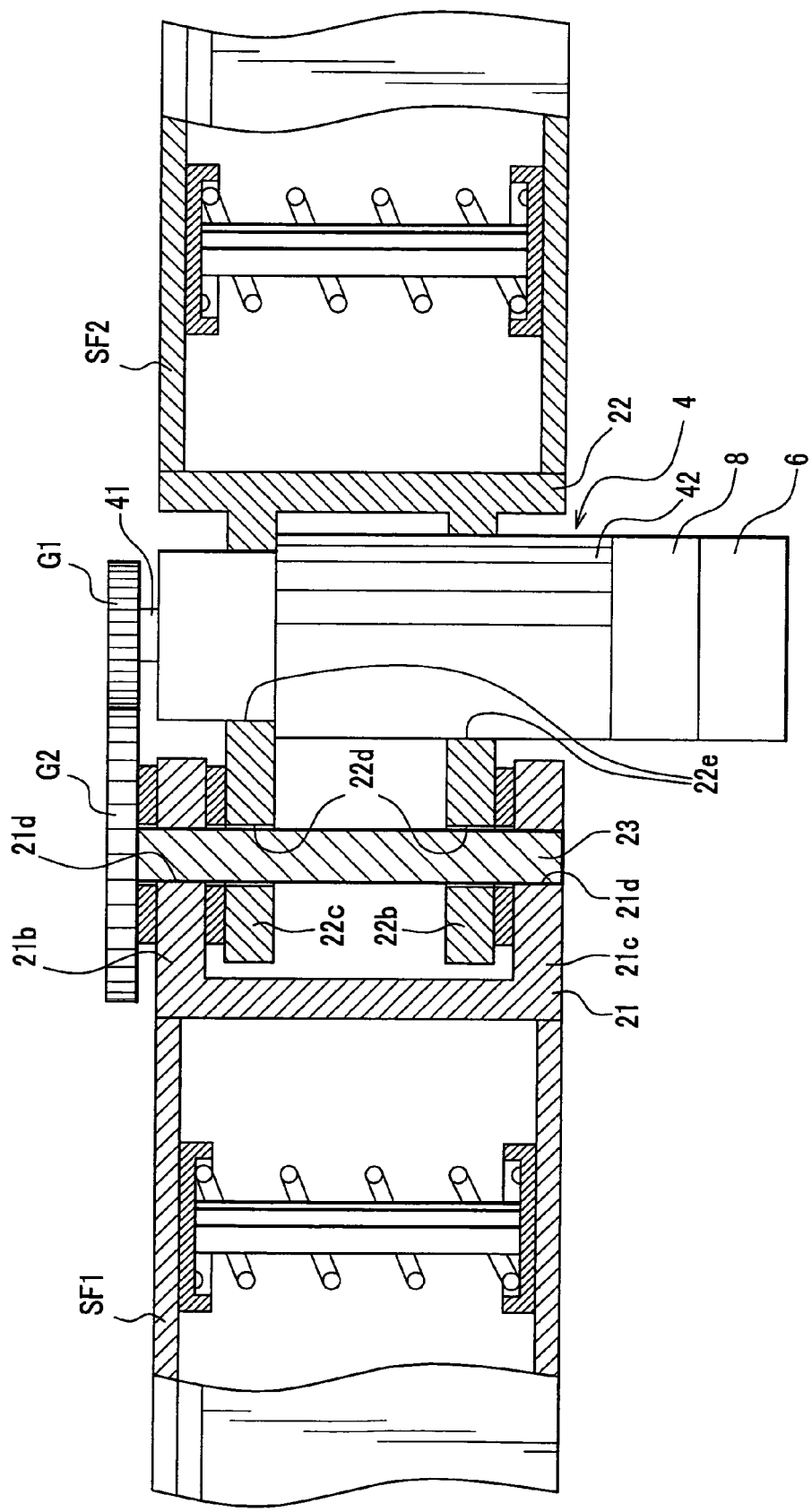
FIG. 10 is a sectional view showing the connection shaft and the servomotor of FIG. 9 in detail.

In the present embodiment, as shown in FIG. 3, the servomotor 4 and the connection shaft 23 are coaxially arranged. The arrangement of these are not limited to this, for example, as shown in FIG. 9 and FIG. 10, the servomotor 4 and the connection shaft 23 may be arranged separately. In this case, by joining the servomotor 4 and the connection shaft 23 through gears G1 and G2, the transmission of a rotative force caused by the servomotor to the connection shaft 23 can be achieved.

Here, detailed explanation of this case will be made. The construction shown in FIG. 9 and FIG. 10 is represented by changed part of the constructions shown in FIG. 2. Therefore, components the same as that of shown in FIG. 2 are indicated by the same symbols, and brief descriptions of then are omitted.

As shown in FIG. 10, the connection shaft 23 is inserted in respective holes 21d of the first hinge 21 and respective holes 22d of the second hinge 22.

The connection shaft 23 is being fixed to holes 21d so as not to allow the rotation around the connection shaft 23 of the first hinge 21, and is not being fixed to holes 22d so as to allow the rotation around the connection shaft 23 of the second hinge 22.

A motor insertion hole 22e, which is used for arranging a body 42 of the servomotor 4, is formed on respective junction parts 22b and 22c of the second hinge 22.

A rotation shaft 41 of the servomotor 4 and the connection shaft 23 are joined through gears G1 and G2. A diameter of the gear G1 to be attached to the rotation shaft 41 is small in size than the diameter of the gear G2 to be attached to the connection shaft 23.

By determining the size of respective gears G1 and G2 like this, a torque to be caused by the servomotor 4 can be increased by gears G1 and G2. Thus, the size of the servomotor 4 itself can be minimized.

Here, if the servomotor 4 and the connection shaft 23 are coaxially arranged, this enables to make the length of the side-frame shorter and to improve the efficiency of torque transmission.

In the present embodiment, the axial deformation is promoted by the buckling device 5. The buckling device 5 may be omitted in the active deformation control unit 1.

In the present embodiment, the side-frame SF divided into four parts is adopted. But, the number of the divided parts is not limited to this. Any numbers of divided parts can be adoptable.

In the present embodiment, the side-force is caused by heating the spring member 51 made of a shape-memory alloy. The side force may be caused mechanically by pushing the frame using a screw motor or a piston.

The rotation direction of the joint unit 2 may be determined based on a shape of the frame as appropriate.

The connection shaft 23 which serves as the rotation center of the joint unit 2 may be disposed along a width direction or ups-and-downs directions with respect to the vehicle V.

In this embodiment, the active deformation control unit adopted to the side-frame, which is disposed in a fore-side of the vehicle, has been explained. The present embodiment's active deformation control unit may be adopted to a side-frame SF, which is disposed at both sides in a fore-side of the vehicle V, a side-sill, which is disposed at the bottom of a door, and a cross-frame, which is disposed along a width direction of the vehicle.

Second Embodiment

Next, as the other embodiment of the frame deformation control apparatus, an axial deformation control unit 101 applied to a frame disposed in a rear-side of a vehicle will be explained.

Figure 11:
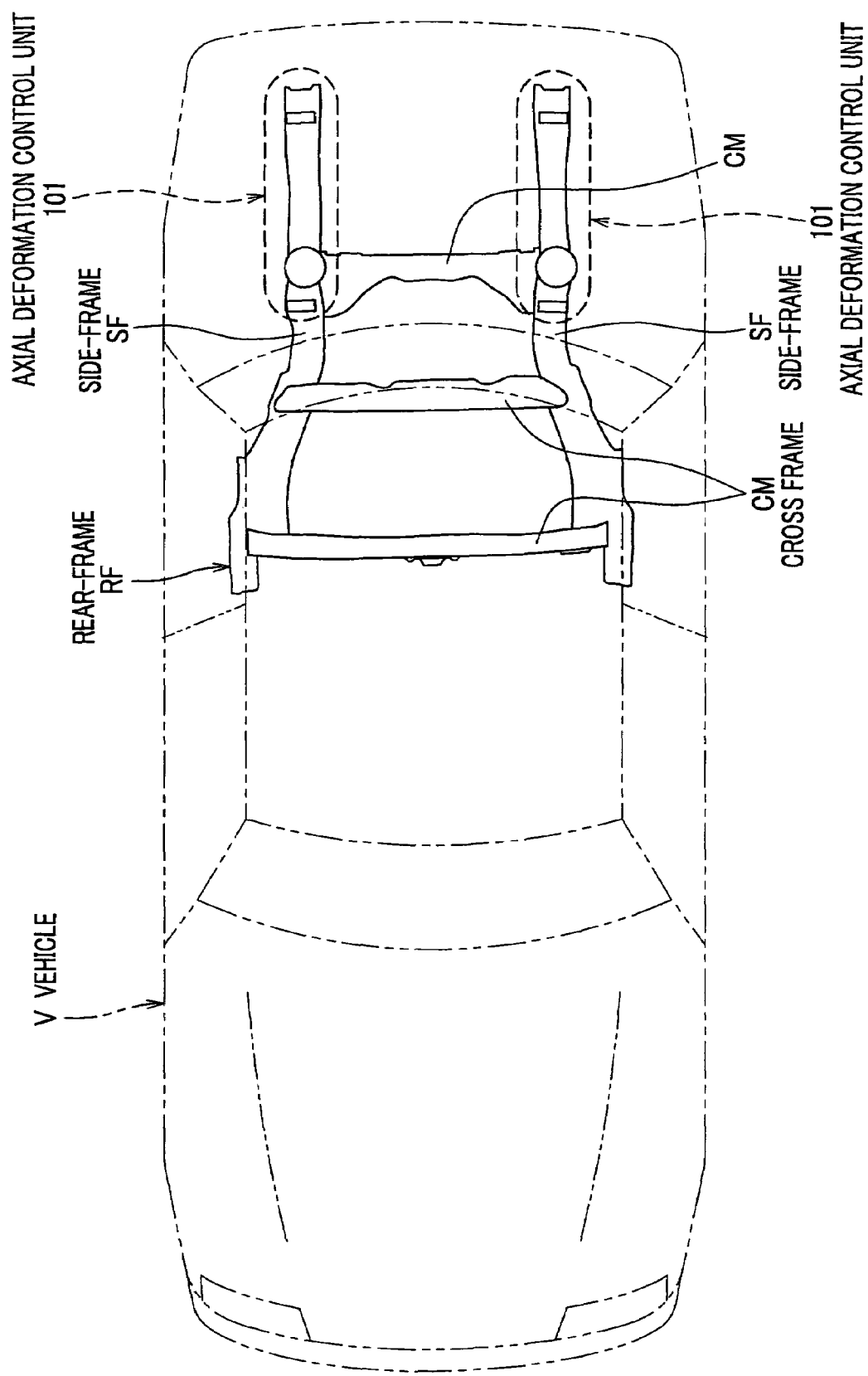
FIG. 11 is a plane view showing the rear-side frame, to which the frame deformation control apparatus is provided.

As shown in FIG. 11, a rear-frame RF, which is located at the bottom in a rear-side of the vehicle V, is composed of side-frames SF and cross-frames CM. The side-frame SF is disposed at both sides along a fore-and-rear direction of the vehicle V. Each side-frame SF is joined by a total of three cross-frames CM, and is provided with an axial deformation control unit 101.

Figure 12:
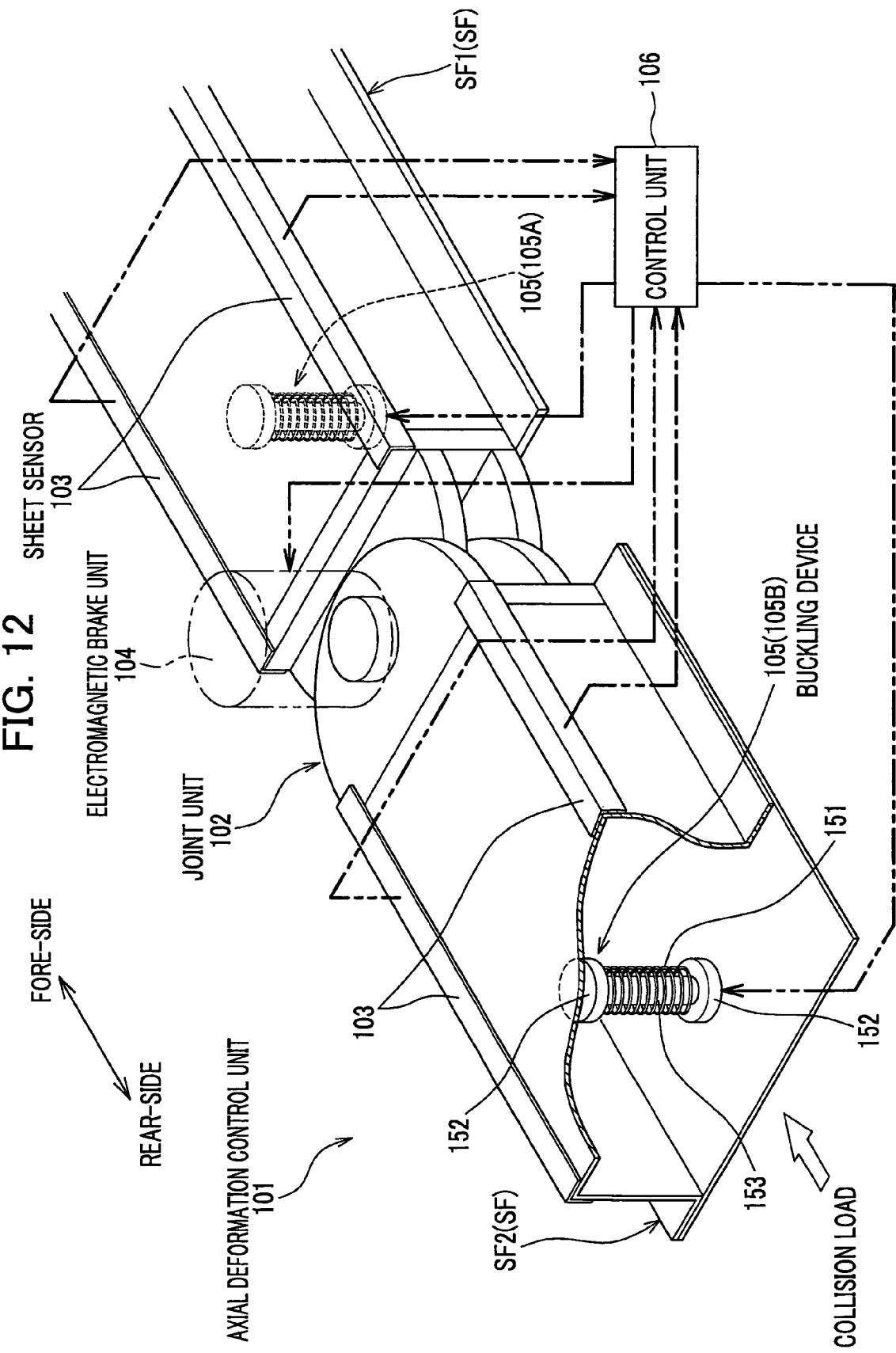
FIG. 12 is a partially enlarged view of FIG. 11.

In the present embodiment, as shown in FIG. 12, the side-frame SF, to which the axial deformation control unit 101, is disposed, is divided into two sub-frames. Here, in order to distinguish respective sub-frames, the sub-frame positioned in a fore-side of the vehicle and the sub-frame positioned in a rear-side of the vehicle V are indicated as "fore-side frame" and "rear-side frame", respectively.

The axial deformation control unit 101 includes a joint unit 102, a sheet sensor 103, and an electromagnetic brake unit 104.

The joint unit 102 joins sub-frames (the fore-side frame and the rear-side frame) constructing the side-frame SF while allowing the turn around the joint unit 102 of sub-frames. The sheet sensor 3, which is a sheet-like shaped sensor, senses bending moment added to the side-frame SF. The electromagnetic brake unit 104 restricts the mutual turn around the joint unit 102 of sub-frames.

The axial deformation control unit 101 further includes a buckling device 105 and a control unit 106.

The buckling device 105 promotes an axial deformation of the side-frame SF by adding a side-force to the side-frame SF. The control unit 106 controls the motion of the electromagnetic brake unit 104 and the buckling device 105 based on a signal entered from the sheet sensor 103.

Figure 13:
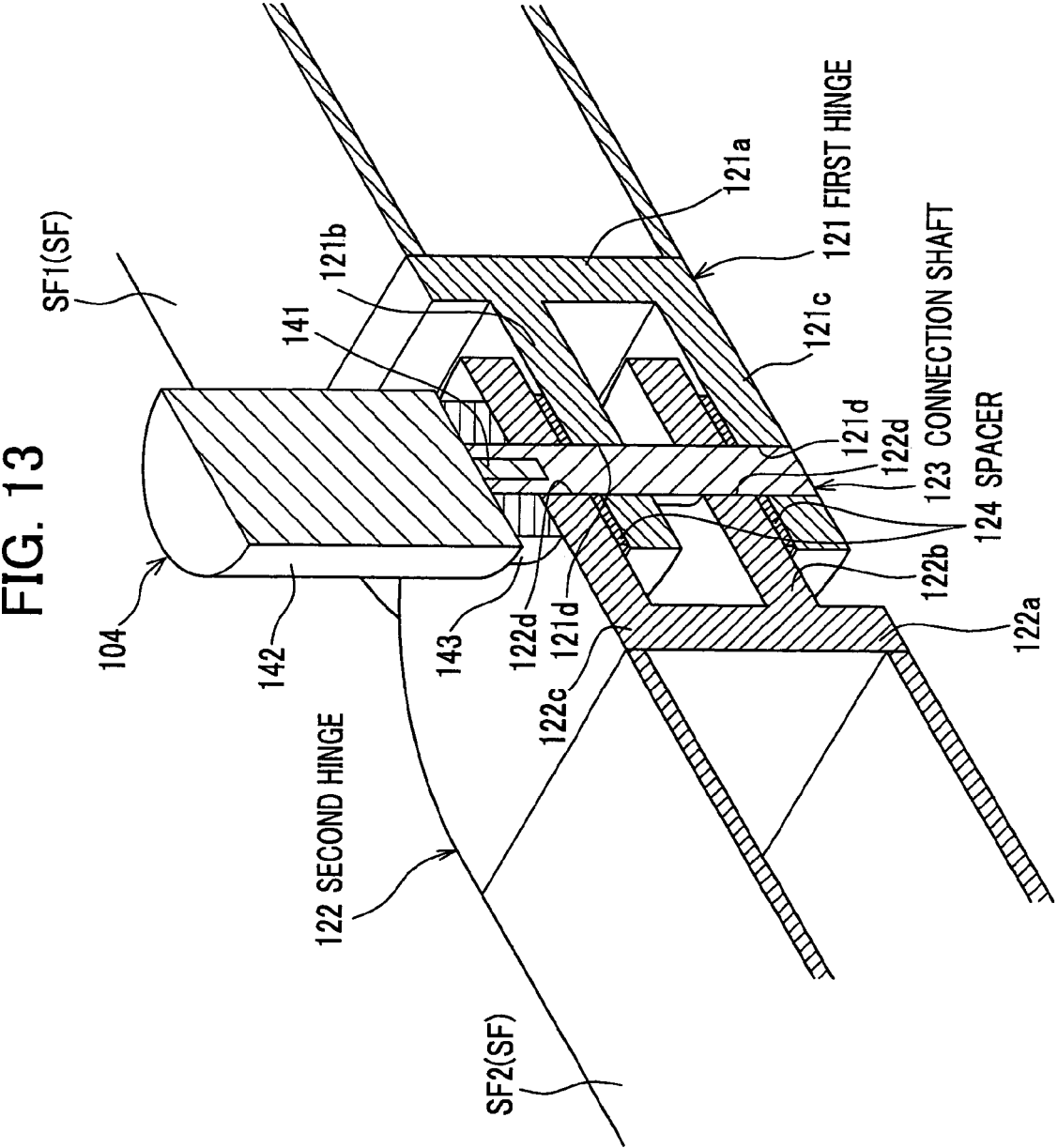
FIG. 13 is a partially-cutaway view of the joint unit of FIG. 12.

The joint unit 102, as shown in FIG. 13, includes a first hinge 121, a second hinge 122, a connection shaft 123, and a spacer 124.

The first hinge 121 is composed of a connection plate 121a being fixed to the fore-side frame SF1, and junction parts 121b and 121c prolonged from the connection plate 121a in a direction opposite to the fore-side frame SF1. As can be seen from FIG. 13, the first hinge 121 has a shape of an alphabet "F" in sectional viewing.

A hole 121d, into which the connection shaft 123 is inserted, is formed on respective junction parts 121b and 121c. Here, the connection shaft 123 is fixed with respective junction parts 121b and 121c by providing a key groove etc., in holes 121d. Thereby, the connection shaft 123 is being un-rotatable with respect to the first hinge 121.

The second hinge 122, similar to the first hinge 121, is composed of a connection plate 122a, which is fixed to the rear-side frame SF2, and junction parts 122b and 122c. As can be seen from FIG. 13, the second hinge 122 has a shape of an alphabet "F" in sectional viewing. A hole 122d, into which the connection shaft 123 is inserted, is formed on respective junction parts 122b and 122c. Here, the connection shaft 123 is being rotatable with respect to the second hinge 122.

As shown in FIG. 13, the first hinge 121 is coupled with the second hinge 122 in the condition that the orientations of the first hinge 121 and the second hinge 122 are upside down with each other. A ring-shaped spacer 124 is provided between the junction parts 122b and 121c and between the junction parts 122c and 121b, respectively.

As shown in FIG. 12, the sheet sensor 103 is a long sheet to be bonded along the corner of respective sub-frames, that is, the fore-side frame SF1 and the rear-side frame SF2, and the sheet sensor 103 includes an optic fiber (not shown), a strain gauge (not shown), and a piezoelectric element (not shown) therein.

The sheet sensor 103 detects the deformation and deformation acceleration of side-frame SF by the optic fiber, measures a sign of the change from elastic region to plastic region by the strain gauge, and detects a collision load by the piezoelectric element.

The electromagnetic brake unit 104, as shown in FIG. 13, is a planetary gear including a plurality of gears therein. A rotation shaft of the electromagnetic brake unit 104 is located coaxially with respect to the connection shaft 123, and is joined with the connection shaft 123 in the condition that the relative rotation between a rotation shaft 141 and the connection shaft 123 is inhibited. Thereby, the connection shaft 123 is rotated in compliance with the rotation of the rotation shaft 141. A body 142 of the electromagnetic brake unit 104 is fixed to the junction part 122c of the second hinge 122. Here, the connection shaft 123 is being rotatable with respect to a support table 143.

The electromagnetic brake unit 104 controls the relative rotation between the body 142 and the connection shaft 123, based on a control signal entered from the control unit 106 (see FIG. 12). To be more precise, the electromagnetic brake unit 104, in usual state, forbids the relative rotation between the body 142 and the connection shaft 123. On the contrary, the electromagnetic brake unit 104, if a moment of predetermined amount is added to the side-frame SF due to a collision, allows the relative rotation between the body 142 and the connection shaft 123.

In other words, electromagnetic brake unit 104, in usual state, prohibits a rotation of the connection shaft 123 by continuously applying a braking force to the connection shaft 123. On the contrary, the electromagnetic brake unit 104 releases (disengages) the braking force when the side-frame SF receives a moment of predetermined amount.

In the present embodiment, the electromagnetic brake unit 104 and the connection shaft 123 are coaxially arranged. The arrangements of these are not limited to this. For example, like in FIG. 9, the electromagnetic brake unit 104 and the connection shaft 123 may be arranged separately. In this case, by joining the electromagnetic brake unit 104 and the connection shaft 123 using gears, the mutual rotation of the sub-frames can be controlled by the electromagnetic brake unit 104.

Here, if the electromagnetic brake unit 104 and the connection shaft 123 are coaxially arranged, this enables to make the length of the side-frame shorter and to improve the efficiency of torque transmission.

As shown in FIG. 12, the buckling device 105 includes a spring member 151, mounting brackets 152 and 152, an electric heater 153, and a power source (not shown). The spring member is a coil-like shaped spring made of a shape-memory alloy. The mounting bracket 152 is provided on both ends of the spring member 151. The electric heater 153 heats the spring member 151 in compliance with a power supplied from the power source.

Referring to FIG. 12, respective sub-frames of the side-frames SF, that is, the fore-side frame SF1 and the rear-side frame SF2 are provided with a buckling device 105 (105A and 105B). Here, since a hollow frame is adopted as sub-frame (side-frame SF), the buckling device 105 is installed within the sub-frame. To be more precise, in case of FIG. 12, the buckling device 105 is sandwiched between opposing walls of the fore-side frame SF1 (the rear-side frame SF2).

According to this buckling device 105, a force (side-force) directed to the outward direction is applied to the side-frame SF, if the power source (not shown) connected to the buckling device 105 is turned on and the electric heater 153 is actuated. This is because the spring member 151 is extended in a longitudinal direction thereof due to a thermal expansion. Therefore, in case of FIG. 12, since the spring member 151 is extended in a ups-and-downs direction in FIG. 12, a force (side force) pushing the opposing walls of the side-frame SF to the outward direction is applied to the side-frame SF from inside thereof.

In the following explanation, in order to distinguish each buckling device 105, respective buckling devices 105 are also indicated as a fore-side device 105A and a rear-side device 105B.

In the present embodiment, the expansion of the spring member 151 is caused by adding a heat to the spring member 151 using the electric heater 153. But, the expansion of the spring member 151 may be caused by applying a direct current to the spring member 151.

In the present embodiment, additionally, coil-like shaped spring is adopted as the spring member 151. But, the shape of the spring member is not limited to this, and various kinds of springs, for example, a non-liner plate spring, may be adoptable as this spring member 151.

Figure 14:
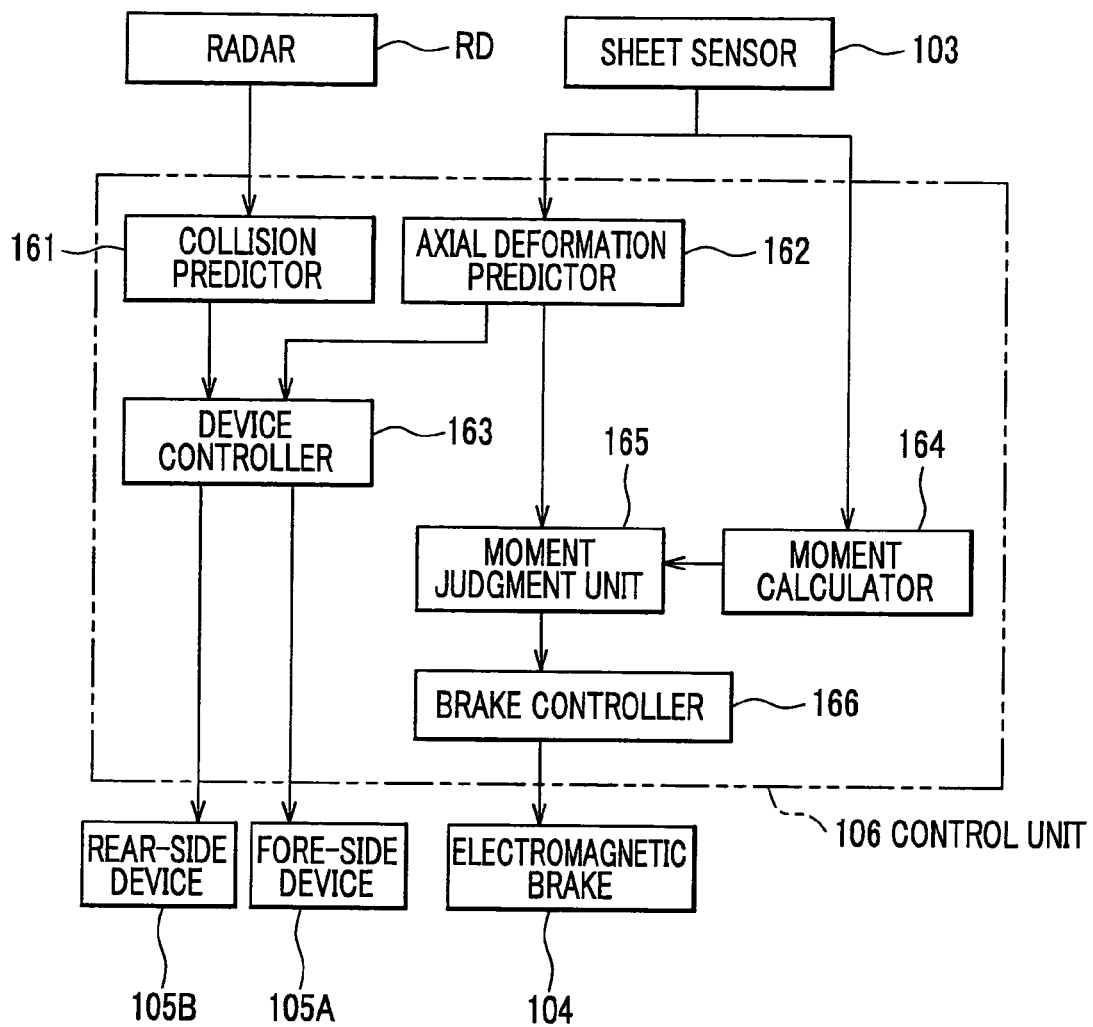
FIG. 14 is a block diagram showing the control unit of FIG. 12.

As shown in FIG. 14, the control unit 106 includes a collision predictor 161, an axial deformation predictor 162, a device controller 163, a moment calculator 164, a moment judgment unit 165, and a brake controller 166.

The collision predictor 161 judges whether or not a collision occurs based on a signal entered from a radar RD. Here, the radar RD is disposed at rear-side of the vehicle V and is used for detecting the occurrence of a rear-side collision of the vehicle V. The collision predictor 161, if it is judged that collision will occur, outputs a signal notifying the occurrence of the collision to the device controller 163.

The axial deformation predictor 162 checks the progress of the axial deformation in a vicinity of the buckling device 105 of the side-frame SF, based on a signal entered from the sheet sensor 103.

The axial deformation predictor 162 outputs a signal, which indicates the deformation is in progress, to the moment judgment unit 165, if it is judged that the axial deformation is in progress on the side-frame SF. On the contrary, the axial deformation predictor 162 outputs a signal, which indicates the deformation has been terminated, to the device controller 163, if it is judged that the axial deformation has been terminated.

The device controller 163 outputs a signal, which commands the activation of the power source, to the rear-side device 105B (see FIG. 12), when the signal is entered from the collision predictor 161.

Additionally, the device controller 163 outputs a signal, which commands the activation of the power source, to the fore-side device 105A, when the signal is entered from the axial deformation predictor 162.

The moment calculator 164 computes a bending moment being added to the fore-side frame SF1 and the rear-side frame SF2 based on the signal entered from the sheet sensor 103, and the moment calculator 164 outputs a signal, which indicates a computed result, to the moment judgment unit 165.

The moment judgment unit 165, when a signal is entered from the axial deformation predictor 162, obtains a bending moment from the signal entered from the moment calculator 164, and compares the bending moment with a collapse moment. Here, the collapse moment is an intensity of a moment that causes a bending deformation of the side-frame SF, and data of the collapse moment is stored beforehand in a recording unit (not shown).

The moment judgment unit 165 outputs a signal, which forbids the relative rotation between the body 142 and the connection shaft 123 by changing the condition of the electromagnetic brake unit 104 in the fixed condition, to the brake controller 166, when the bending moment is smaller than the collapse moment. On the other hand, the moment judgment unit 165 outputs a signal, which allows the relative rotation between the body 142 and the connection shaft 123 by releasing the electromagnetic brake unit 104, to the brake controller 166, when the bending moment exceeds the collapse moment.

The brake controller 166 controls the switching operation between the rotation condition and the fixed condition of the electromagnetic brake unit 104, based on the signal entered from the moment judgment unit 165.

Signal Processing in the Control Unit 106

Next, the signal processing in the control unit 106 will be explained with reference to FIG. 14 and FIG. 15.

Figure 15:
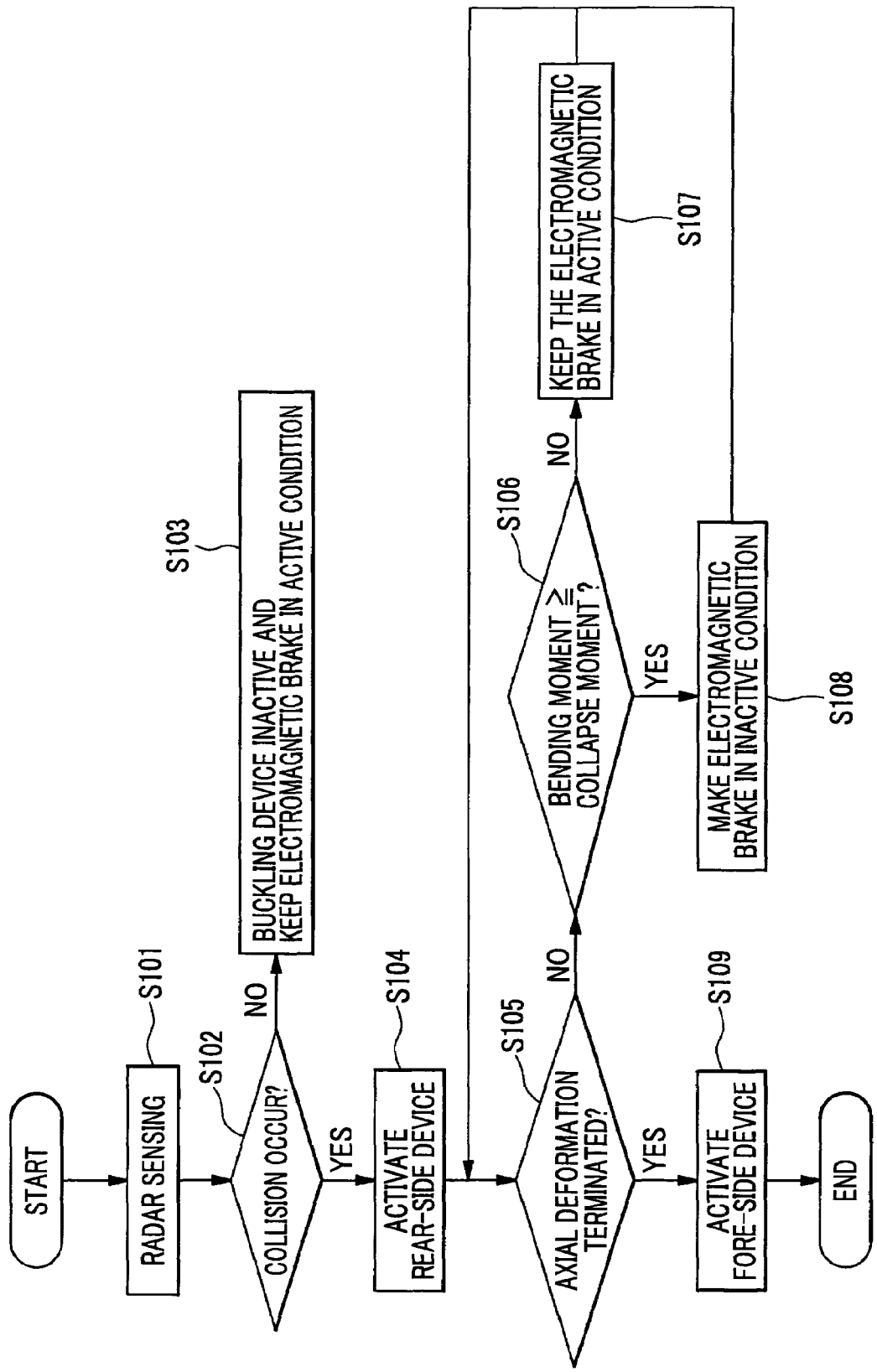
FIG. 15 is a flow chart showing the signal processing performed in the control unit.

FIG. 15 is a flow chart showing the signal processing performed in the control unit 106.

Referring to FIG. 15, when a signal is entered from the radar RD, which is used for checking the occurrence of the collision of the vehicle V (step S101), the collision predictor 161 judges whether or not the collision of the vehicle V will occur based on a signal entered from the radar RD (step S102).

If the collision predictor 161 judges that the collision of the vehicle V does not occur (step S102. NO), the buckling device 105 is kept in an inactive condition and the electromagnetic brake unit 104 is kept in an active condition (step S103). Thereby, the stiffness of the vehicle body is kept in high. Here, in usual state, the electromagnetic brake unit 104 is kept in an active condition.

If it is judged that the collision of the vehicle V will occur (step S102, YES), the second device 5B is activated by the device controller 163. Thereby, the side-force caused by the spring member 151 is added to the rear-side frame SF2 (step S104).

Next, the axial deformation predictor 162 checks whether or not the axial deformation of the rear-side frame SF2 has been terminated (step S105).

If it is judged that the axial deformation has not been terminated, that is, the axial deformation is in progress (step S105, NO), the moment judgment unit 165 compares the bending moment being currently applied to the rear-side frame SF2 with the collapse moment (step S106).

If the bending moment is smaller than the collapse moment (step S106, NO), the condition of the electromagnetic brake unit 104 is changed to the fixed condition by a command signal entered from the brake controller 166 (step S107). Then, the signal processing is returned to step S105.

If the bending moment exceeds the collapse moment (step S106, YES), the condition of the electromagnetic brake unit 104 is released (changed to the rotatable condition) by a command signal entered from the brake controller 166 (step S108). Then, the signal processing is returned to step S105.

If it is judged that the axial deformation has been terminated (step S105, YES), the device controller 163 activates the first device 5A. Thereby, the side-force caused by the spring member 151 is added to the fore-side frame SF1 (step S109).

By controlling the motion of the buckling device 105 and the electromagnetic brake unit 104 along above-described manner, the axial deformation of the side-frame SF can be caused in order from rear-side thereof.

In the above described embodiment, the signal processing, which is performed in case that collision load is added from the rear-side frame SF2, has been explained.

If collision load is added from the fore-side frame SF1, the axial deformation of the side-frame SF as a whole can be achieved by reversing the processing order of frames (the fore-side frame SF1 and the rear-side frame SF2).

Simulation of the Deformation of the Side-Frame SF

Next, a simulation result of an axial deformation of the side-frame SF under the control of the axial deformation control unit 101 will be explained.

Here, in FIG. 16, the progress of the axial deformation in case of where collision load is added from the fore-side of the fore-side frame SF1 is indicated.

Figure 16A:
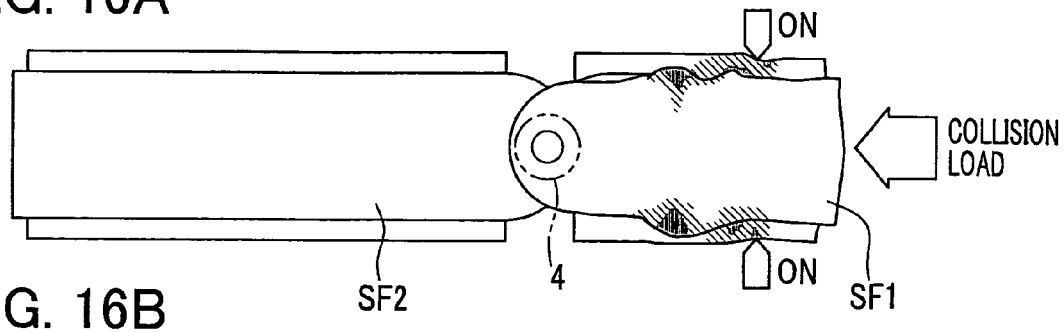
FIG. 16A is an explanatory view showing the beginning of the axial deformation of the fore-side frame.
Figure 16B:
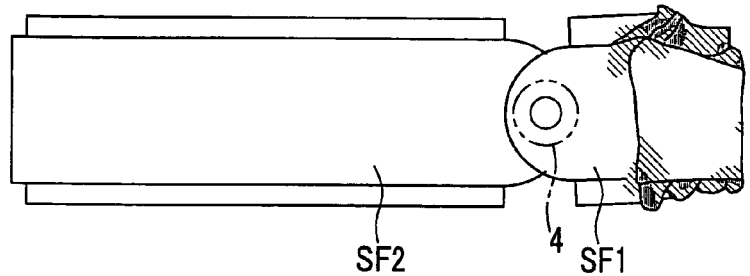
FIG. 16B is an explanatory view showing the state where the axial deformation of the fore-side frame is in progress.
Figure 16C:
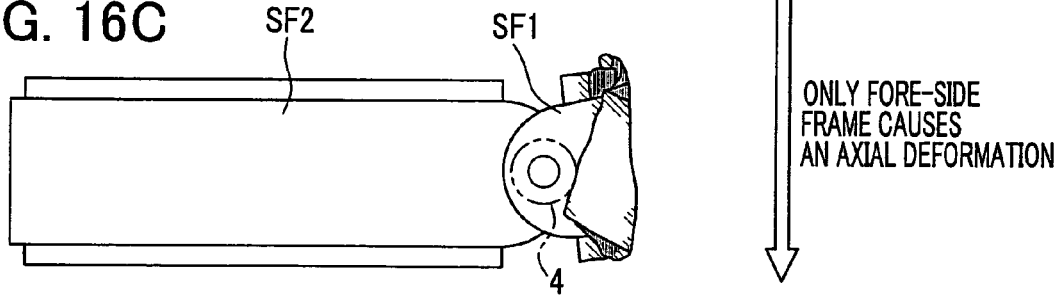
FIG. 16C is an explanatory view showing the state where the axial deformation of the fore-side frame has been terminated.

As shown in FIG. 16A, if collision load is added to the fore-side of the fore-side frame SF1, the side force is caused in the vicinity of the fore-side device 5A by activating the fore-side device 5A (see FIG. 12). Thereby, the axial deformation is caused on the region the side force is added to. Here, the region the side force is added to is shown by a symbol "ON".

In this occasion, if the bending moment of more than the collapse moment is added to the fore-side frame SF1 or the rear-side frame SF2, the influence of the bending moment is canceled by releasing the electromagnetic brake unit 104.

Thus, while in the progress of the axial deformation, the condition of the electromagnetic brake unit 104 is suitably switched between the rotation condition and the fixed condition. Thereby, as can be seen from FIGS. 16B and 16C, the axial deformation of the fore-side frame SF1 is achieved instead of the bending deformation at the middle of the fore-side frame SF1 or rear-side frame SF2.

Figure 16D:
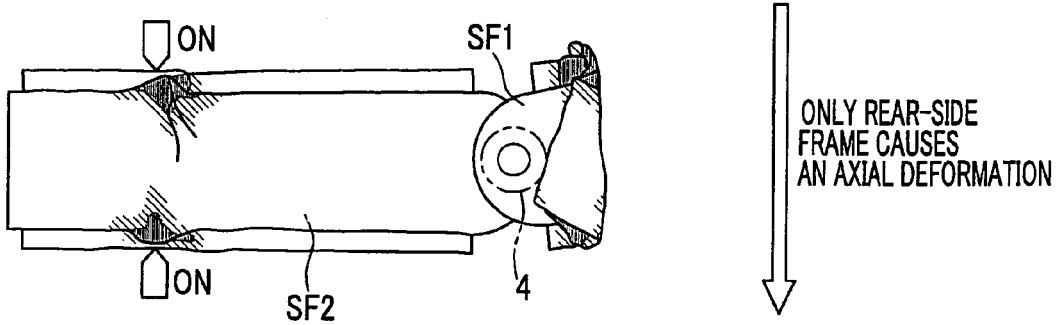
FIG. 16D is an explanatory view showing the beginning of the axial deformation of the rear-side frame.
Figure 16E:
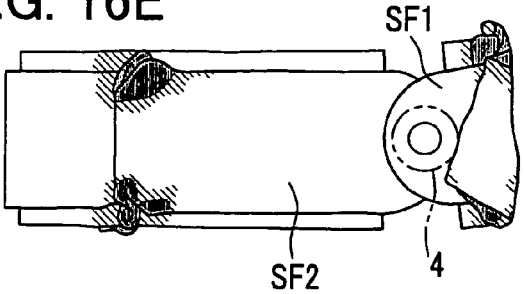
FIG. 16E is an explanatory view showing the state where the axial deformation of the rear-side frame has been terminated.

Then, if the axial deformation of the fore-side frame SF1 has been terminated, as shown in FIG. 16D, the side force is caused in the vicinity of the rear-side device 105B by activating the rear-side device 105B (see FIG. 12). Thereby, the axial deformation is caused on the region the side force is added to. Here, the region the side force is added to is shown by a symbol "ON" in FIG. 16D.

In this case, by activating the electromagnetic brake unit 104, the bending moment is controlled below the collapse moment. Thereby, as can be seen from FIGS. 16D and 16E, the axial deformation of the rear-side frame SF2 is achieved instead of the bending deformation of the rear-side frame SF2.

Next, the comparison result between the conventional side-frame and the side-frame of the present embodiment will be explained.

Figure 17:
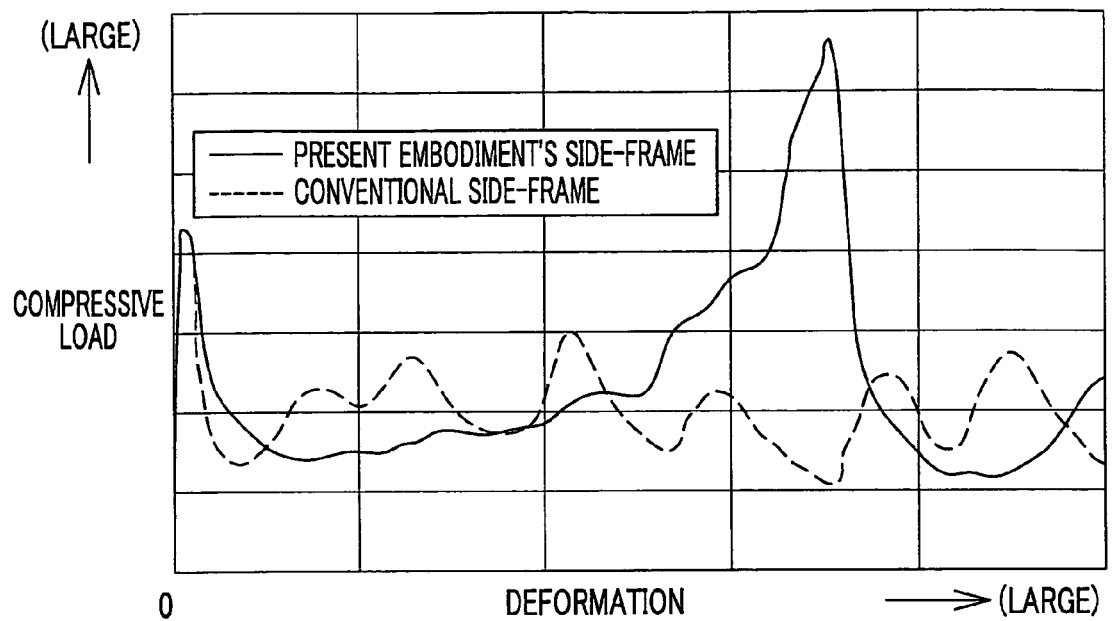
FIG. 17 is a graph showing the relation between a compressive load and a deformation of the frame.

As shown in FIG. 17, in the conventional side-frame, a comparatively large compressive load is added to the side-frame during the early stage of the axial deformation of the side-frame. Then, the compressive load smaller than the compressive load during the early stage is continuously added to the side-frame SF.

On the contrary, in the side-frame SF of the present embodiment, the compressive load, which has almost the same intensity as the compressive load to be caused in the conventional side-frame, is added to the side-frame SF during the early stage of the axial deformation of the side-frame SF. Thus, the compressive load of comparatively high intensity is added to the side-frame SF, after the deformation proceeds in a certain degree.

Thereby, in the side-frame SF of the present embodiment, the axial deformation of the side-frame SF can be achieved easily than the conventional construction's side-frame by adding the comparatively high compressive load.

Figure 18:
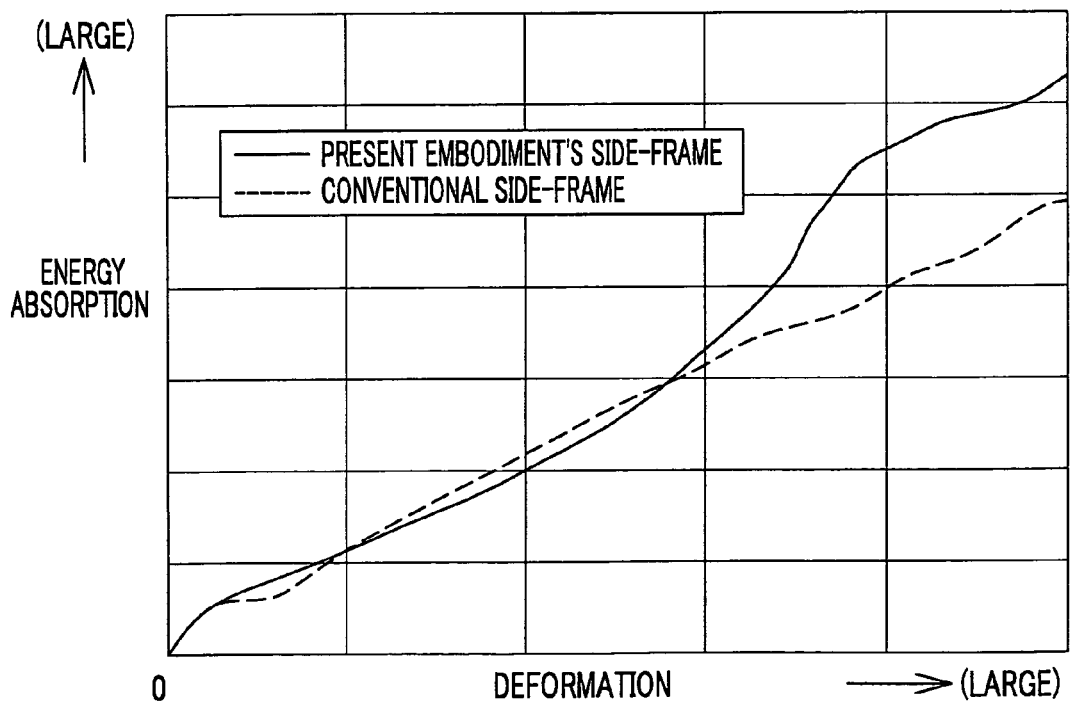
FIG. 18 is a graph showing the relation between energy absorption and a deformation of the frame.

As shown in FIG. 18, the amount of energy absorption of the side-frame SF of the present embodiment is increased about 40% compared with the amount of energy absorption of the conventional side-frame.

Thereby, the side-frame SF of the present embodiment can absorb the collision load sufficiently than the conventional side-frame.

According to the present embodiment, the benefits as follows can be obtained.

The bending moment can be canceled by releasing the electromagnetic brake unit 104, even if bending moment is locally concentrated on the part of the side-frame SF. In other words, the bending moment can be canceled by allowing the mutual roration around the joint unit 102 of sub-frames (side-frame SF).

Thus, the axial deformation can be caused in preference to the bending deformation even if the length of the side-frame is long.

In the present embodiment, additionally, the axial deformation is caused from the region, to which the side force is applied using the buckling device 105. Thus, the axial deformation of the side-frame SF can be caused on a desired position.

In the present embodiment, the buckling device 105 is disposed in a rear side of respective sub-frames (the fore-side frame SF1 and the rear-side frame SF2). But, the position and number of the buckling device 105 can be determined as appropriately.

For example, as shown in FIG. 19, the buckling device 5 may be disposed in a fore-side of the rear-side frame SF2. In this case, the axial deformation can be caused on a fore-side of the rear-side frame.

Figure 20A:
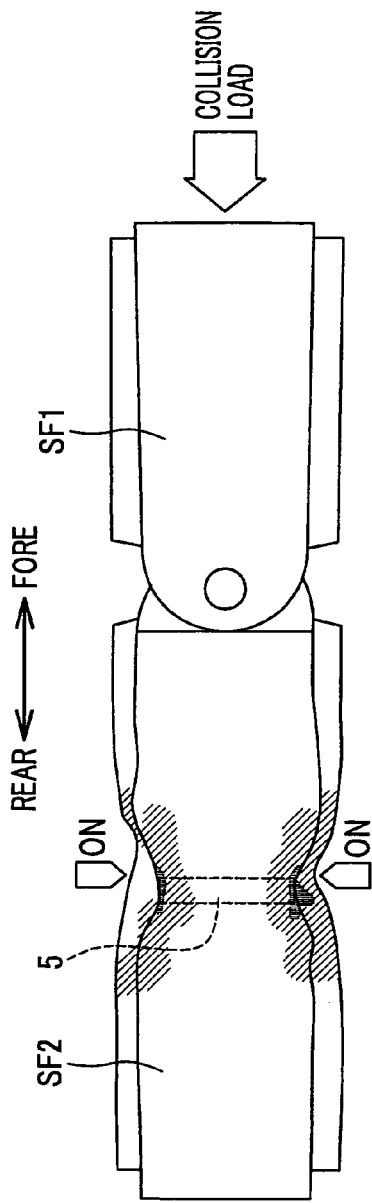
FIG. 20A is an explanatory view showing the beginning of the axial deformation of the rear-side frame, wherein the buckling device is disposed in a middle of the rear-side frame.
Figure 20B:
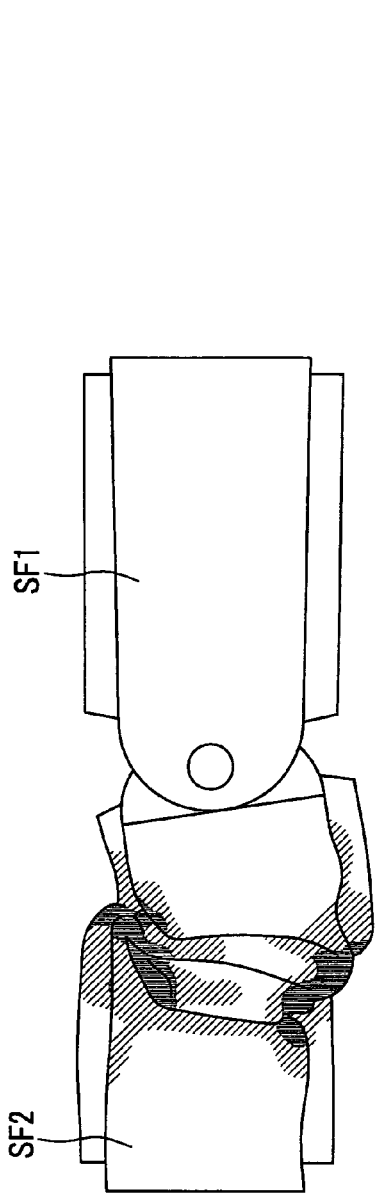
FIG. 20B is an explanatory view showing the state where the axial deformation of the rear-side frame is in progress, wherein the buckling device is disposed in a middle of the rear-side frame.
Figure 20C:
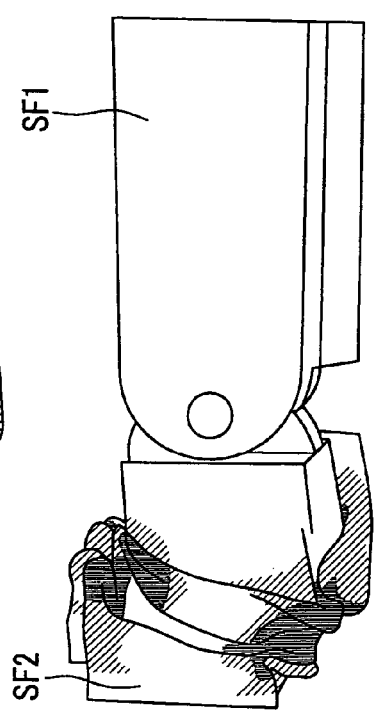
FIG. 20C is an explanatory view showing the state where the axial deformation of the rear-side frame has been terminated, wherein the buckling device is disposed in a middle of the rear-side frame.

Additionally, as shown in FIG. 20, the buckling device 5 may be disposed in a middle of the rear-side frame SF2. In this case, the axial deformation can be caused on a middle of the rear-side frame SF2.

In the present embodiment, the side-frame SF divided into two parts is adopted. But, the number of the divided parts is not limited to this. Any numbers of divided parts can be adoptable. In this case the number of the joint unit 102 and the electromagnetic brake unit 104 should be changed in compliance with the number of divided parts.

In the present embodiment, the side force is caused by heating the spring member 151 made of a shape-memory alloy. The side force may be caused mechanically by pushing the frame using a screw motor or a piston.

The rotation direction of the joint unit 102 may be determined based on a shape of the frame as appropriate.

The connection shaft 123 which serves as the rotation center of the joint unit 102 may be disposed along a width direction or an ups-and-downs direction with respect to the vehicle V.

In this embodiment, the axial deformation control unit 101 adopted to the side-frame SF of the rear-frame RF has been explained. The present embodiment's axial deformation control unit may be adopted to a side-frame SF, which is disposed at both sides in a fore-side of the vehicle V, a side-sill, which is disposed at the bottom of a door, and a cross-frame, which is disposed along a width direction of the vehicle.

Although there have been disclosed what are the patent embodiment of the invention, it will be understood by person skilled in the art that variations and modifications may be made thereto without departing from the scope of the invention, which is indicated by the appended claims.

What is claimed is:

1. A vehicle frame deformation control apparatus to be used for a frame composed of a plurality of vehicle sub-frames, the vehicle frame deformation control apparatus comprising:

a joint unit connecting adjoining vehicle sub-frames, the joint unit allows the adjoining vehicle sub-frames to turn around the joint unit;

a detector measuring a bending moment to be added to the adjoining vehicle sub-frames;

a brake unit restricting the turn around of the joint unit of the adjoining vehicle sub-frames;

a moment canceller causing a reverse moment, which acts in an opposite direction with respect to the bending moment measured by the detector, when the bending moment measured by the detector exceeds a predetermined value; and an axial deformation accelerator applying a side-force in order to induce axial deformation on one of the vehicle sub-frames.

2. A vehicle frame deformation control apparatus according to claim 1 wherein when a bending moment detected by the detector exceeds a predetermined value, a restriction of the brake unit is reduced and axial deformation is generated by activating the axial deformation accelerator of the adjoining vehicle sub-frames.

* * * * *